United States Patent [19]
Lindberg et al.

[11] Patent Number: 6,157,639
[45] Date of Patent: Dec. 5, 2000

[54] TIME SWITCH STAGES AND SWITCHES

[75] Inventors: Mikeal Lindberg, Täby; Ulf Hansson, Huddinge; Fredrik Olsson, Trångsund, all of Sweden

[73] Assignee: Telefonaktiebolaget LM Ericsson, Stockholm, Sweden

[21] Appl. No.: 09/035,775

[22] Filed: Mar. 6, 1998

[30] Foreign Application Priority Data

Mar. 10, 1997 [SE] Sweden ................... 9700851

[51] Int. Cl.[7] .................................. H04Q 11/04
[52] U.S. Cl. .......................... 370/360; 370/370
[58] Field of Search ................... 370/389, 395, 370/397, 401, 442, 503, 252, 321, 334, 346, 345, 350, 349, 348, 459, 461, 462, 360, 369, 370, 371, 376, 375, 377, 380, 387

[56] References Cited

U.S. PATENT DOCUMENTS

| | | | |
|---|---|---|---|
| 4,704,716 | 11/1987 | Bowers et al. | 370/58 |
| 4,809,259 | 2/1989 | Jösson | 370/58 |
| 4,809,263 | 2/1989 | van Baardwijk et al. | 370/66 |
| 4,858,227 | 8/1989 | Ratcliff | 370/59 |
| 5,594,734 | 1/1997 | Worsley et al. | 370/513 |
| 5,841,771 | 11/1998 | Irwin et al. | 370/383 |

FOREIGN PATENT DOCUMENTS

| | | |
|---|---|---|
| 0 229 365 | 7/1987 | European Pat. Off. . |
| 0 532 914 | 3/1993 | European Pat. Off. . |
| 461 310 | 1/1990 | Sweden . |

*Primary Examiner*—Dang Ton
*Attorney, Agent, or Firm*—Burns, Doane, Swecker & Mathis, L.L.P.

[57] ABSTRACT

Sequence integrity and frame integrity are preserved in switching wideband connections through a switch or a switch stage. The speech memory in a switch stage in the switch is extended to include storage positions that in number correspond to the number of time slots in two frames. These storage positions are arranged into two parts of the same size in the speech memory. Furthermore, there is provided a delay control unit in the time switch stage for generating delay information based on control information in the control memory of the switch stage and a determined part of the counter information from a time slot counter circuit. This delay information controls, for each time slot, to/from (depending on if the speech memory is arranged in an outgoing stage or an incoming stage) which one of the first and second parts of the speech memory that user data is switched.

35 Claims, 13 Drawing Sheets

OFFSET-VARIABLE δ = 0

| DATA | POSITION | DATA | POSITION |
|---|---|---|---|
| $t_{in}[0]$ → | $45.t_{int}[0]$ | $t_{out}[0]$ → | $46.t_{int}[0]$ |
| $t_{in}[1]$ → | $45.t_{int}[1]$ | $t_{out}[1]$ → | $46.t_{int}[1]$ |
| $t_{in}[2]$ → | $45.t_{int}[2]$ | $t_{out}[2]$ → | $46.t_{int}[2]$ |
| $t_{in}[3]$ → | $45.t_{int}[3]$ | $t_{out}[3]$ → | $46.t_{int}[3]$ |

OFFSET-VARIABLE δ = 1

| DATA | POSITION | DATA | POSITION |
|---|---|---|---|
| $t_{in}[0]$ | $45.t_{int}[0]$ | $t_{out}[0]$ | $46.t_{int}[0]$ |
| $t_{in}[1]$ | $45.t_{int}[1]$ | $t_{out}[1]$ | $46.t_{int}[1]$ |
| $t_{in}[2]$ | $45.t_{int}[2]$ | $t_{out}[2]$ | $46.t_{int}[2]$ |
| $t_{in}[3]$ | $45.t_{int}[3]$ | $t_{out}[3]$ | $46.t_{int}[3]$ |

OFFSET-VARIABLE δ = 2

| DATA | POSITION | DATA | POSITION |
|---|---|---|---|
| $t_{in}[0]$ | $45.t_{int}[0]$ | $t_{out}[0]$ | $46.t_{int}[0]$ |
| $t_{in}[1]$ | $45.t_{int}[1]$ | $t_{out}[1]$ | $46.t_{int}[1]$ |
| $t_{in}[2]$ | $45.t_{int}[2]$ | $t_{out}[2]$ | $46.t_{int}[2]$ |
| $t_{in}[3]$ | $45.t_{int}[3]$ | $t_{out}[3]$ | $46.t_{int}[3]$ |

*Figure 7b*

TIME SWITCH STAGES AND SWITCHES

This application claims priority under 35 U.S.C. §§119 and/or 365 to SE 9700851-0 filed in Sweden on Mar. 10, 1997; the entire content of which is hereby incorporated by reference.

BACKGROUND

The invention relates to switches and switch stages forming part of telecommunication systems. More specifically, the invention relates to establishing connections through digital circuit-switching switches.

User data switched through a digital switch belong to channels, so called connections. In the switch, user data originating from each connection from a respective input in the switch are switched to a respective selectable output in the switch. A technique used in connection thereto is circuit switching. A common switch structure in circuit switching is called "Time Space Time" (TST). In switches having this structure, a plurality of time switch stages are connected to a space switch stage. User data is first switched through an incoming time switch stage, then through a space switch stage and finally through an outgoing time switch stage.

User data from several connections that are to be switched through a switch of TST-structure are multiplexed by means of time multiplexing. In time multiplexing, the user data is placed in time slots that are arranged in frames. In switching the user data through the switch, it is moved between different time slots and frames. This is accomplished by delaying the user data in memories, so called speech memories, in the time switch stages of the switch. A speech memory comprises storage positions for storing user data. Each storage position corresponds to a time slot and stores, during a certain time, a data word of the user data, such as a byte. In addition to the speech memories, the time switch stages also include control memories and time slot counters by means of which writing of the user data into, and reading of the user data out of the speech memories are performed in different time slots. A control memory also includes storage positions, each of which corresponds to a time slot. A time slot counter cyclically addresses storage positions in the control memory as well as in the speech memory. For each time slot, a storage position in the control memory is addressed for reading control information stored in the control memory. The control information in the control memories in turn addresses the speech memories for reading the user data from the incoming time switch stages on one hand, and for writing the user data into the outgoing time switch stages on the other hand.

User data arriving to an incoming time switch stage appears in incoming time slots. In the space switch stage, the user data is placed by the incoming time switch stage in so called internal time slots. The user data going out from an outgoing time switch stage is placed by the outgoing time switch stage in outgoing time slots. Conflict in the space switch stage is avoided by means of the internal time slots.

Control information is generated in a control system, such as a computer program-controlled control system, being part of the telecommunication system. The control system is connected to the switch. Writing of control information into the control memories is instructed from the control system for assigning time slots used in the switching of the user data through the switch.

In one type of connection, a so called narrowband connection, user data arrives in a single incoming time slot each frame. User data are delayed differently for different narrowband connections. For each narrowband connection, the delay depends on in which incoming time slots that user data arrives to the switch, and in which internal time slots and outgoing time slots that user data for the narrowband connection are switched through the switch. The reciprocal timing relations between the incoming time slots, the internal time slots and the outgoing time slots for a narrowband connection determines the delay of the user data belonging to the narrowband connection.

Another type of connection, a so called wideband connection, occupies several time slots in each frame. User data belonging to a wideband connection arrives in several incoming time slots in each frame, and is switched through the switch in several internal time slots and in several outgoing time slots, in a sense as several separate narrowband connections. Thus, a wideband connection may be considered as an association of several narrowband connections. User data belonging to a wideband connection will consequently be switched through the switch in several narrowband connections with different delays.

A problem in connection thereto is to obtain sequence integrity, so called Time Slot Sequence Integrity (TSSI), and frame integrity, so called Time Slot Frame Integrity (TSFI), for wideband connections, i.e. to assure that data words constituting user data for a wideband connection maintain one and the same reciprocal time order through the switch on one hand, and that those data words that arrive in incoming time slots in one and the same frame are placed in the same frame in outgoing time slots on the other hand.

If as an example frame integrity (TSFI) is not preserved through the switch, then the user terminals in some telecommunication applications have to be equipped with frame analysis and frame regeneration equipment. This means an undesirable increased cost for the users.

U.S. Pat. 4,809,259 to Jönsson discloses an arrangement for establishing a wideband connection in a switching network. A marking device is disposed at the input of the switching network to provide markings in successive frames of the respective contents of the time slots utilized by the connection channels such that each affected time slot in a first frame is assigned a first marking and each affected time slot in a second frame is assigned a second marking. A scanning device is disposed at the output of the switching network to detect the markings such that a possible delay between the respective contents of the channels can be determined. Furthermore, the scanning device controls a delay equalizing device in the channels. The equalizing device comprises at least two paths for the flow of data from the switching network, a first path being a direct path without delay, a second path having a delay memory in the form of a register that delays data one frame, a third path delaying the data two frames, and so on. The scanning device provides delay instructions to a control memory in the equalizing device, and the delay instructions in the control memory control a selector which determines from which one of the paths data is to be read.

The Swedish Patent Publication SE-B-461,310 describes a method and device for switching a wideband connection through a digital time switch. The problem addressed in the Publication is that some time slots are delayed a frame, whereas other time slots are not delayed. According to the Swedish Patent Publication, a processor in the switch determines which outgoing time slots will hold information that is delayed one frame, and which outgoing time slots will hold information that is not delayed, and a control memory in the switch is provided with a marking bit, for each outgoing time slot, that indicates if the time slot is delayed or not. Incoming time slots to the digital time switch are sequentially written into a first speech memory. The first speech memory is connected to an additional separate speech memory, and the incoming time slots stored in the first speech memory are transferred to and written into the additional speech memory with a delay of one frame. During each clock pulse, information stored in a given storage position in the first speech memory is read from the first speech memory and written into the additional speech memory in a corresponding storage position, whereupon information in an incoming time slot in a subsequent frame is written into the first speech memory at the given storage position. Consequently, the additional speech memory will hold information that is delayed one frame relative to the contents of the first speech memory. For each outgoing time slot, information corresponding to the time slot is read from the first speech memory as well as from the additional speech memory and provided to a multiplexor. The multiplexor is controlled by the corresponding marking bit in the control memory, and connects a bus for outgoing time slots either to the first speech memory or to the additional speech memory. In this way, the information in delayed time slots will be read from the first speech memory and transferred onto the bus, and the information in non-delayed time slots will be read from the additional speech memory.

The solution of the Swedish Patent Publication SE-B-461, 310 implies that all outgoing time slots are delayed an extra frame through the switch. The number of necessary memory accesses is increased considerably, since two write operations and two read operations are required for each time slot in the time switch. This increases the amount of dissipated power in the digital time switch. Read-out is performed only from the storage positions in the additional speech memory that are associated with a wideband connection. This means that a malfunctioning storage position in the additional speech memory is not detected until a wideband connection that utilizes that particular storage position is actually established. Consequently, it is not possible to continuously monitor the storage positions of the additional speech memory since parity check of the information in these storage positions can only be performed in connection with read-out onto the outgoing bus from positions associated with established wideband connections.

The European Patent Application 0,532,914 A2 relates to a delay correcting system in a multi-channel PCM-switching system. In accordance with this delay correcting system, an external memory separated from the speech memories in the switch structure itself, and a control unit for delaying some of the data stored in this external memory, are utilized. The external memory is provided at the output (or the input) of the switch, and the data that have been switched through the switch are stored after output therefrom in the external memory. The control unit generates frame correction information of several bits that is sent to a complicated circuit. The circuit functions to delay some of the data stored in the external memory in accordance with the frame correction information such that these data are delayed by the number of frames indicated by the most delayed data through the switch. Consequently, data in an outgoing frame N from the switch can be delayed one or more frames such that these data are outputted in frame N+1, N+2 or N+3.

According to the solution of the European Patent Application 0,532,914 A2, neither the external memory nor the circuit otherwise is integrated in the switch structure itself. In addition, the use of an additional external memory increases the number of necessary memory accesses. Besides, the additional external memory does not have any continuous monitoring of the storage cells, since these cells are used only in delay for established wideband connections and not for narrowband connections.

U.S. Pat. 4,704,716 to Bowers et al. discloses a method and device for establishing a wideband connection comprising a number of segments of TDM-channels through a communication network. In particular, a switching network of TST-type is provided with additional buffer memories in the incoming time stage and the outgoing time stage to assure that all data received in a time frame from a given segment is assembled only into the same outgoing time frame. In the incoming stage, two buffer memories are used, where all data in a given frame is stored in one of these buffer memories in a given frame period, at the same time as read-out of data in the other buffer memory is performed, and read out of the same buffer memory the next time period, at the same as data is stored in the other buffer memory. In the outgoing stage, where the read and write cycles of a time frame do not coincide because of signal delays in the switching network, three buffer memories are used in a way corresponding to that in the incoming time stage to assure that data in a given time frame are maintained in the same time frame.

This solution results in an extra delay in both the incoming stage and the outgoing stage. A plurality of additional buffer memories are required, and in addition, the writing and reading alternately between the different buffer memories have to be administered in some way.

SUMMARY

A main object of the invention is to find a simple way of obtaining sequence integrity (TSSI) and frame integrity (TSFI) in switching connections through a switch or a switch stage.

Further, an object of the invention is to provide a realization which delays some data in such a way that the integrity requirements are fulfilled. This realization should be integrated in the switch itself in such a way that only a minimum of extra equipment needs to be used. In addition, it is desirable to be able to easily monitor the realization continuously.

A further object of the invention is to obtain sequence and frame integrity with minimized delay of the user data through the switch and without increasing the number of necessary memory accesses.

These objects are met by the invention as defined in the accompanying patent claims.

User data belonging to a connection, preferably a wideband connection, are distributed, on one hand, among the internal time slots in each frame that have been assigned to the wideband connection for switching the user data through the switch, and on the other hand among the outgoing time slots in each frame that have been assigned to the wideband connection for switching the user data through the switch.

According to a general inventive concept, the speech memory in a switch stage of the switch is extended such that it includes storage positions that in number correspond to the number of time slots in two frames. These storage positions are arranged in two memory parts of equal size in the speech memory. Furthermore, a delay control unit is provided in the time switch stage for generating delay information based on control information in the control memory of the switch stage and a determined part of the counter information from a time slot counter circuit. This delay information controls, for each time slot, to/from (depending on whether the speech memory is arranged in an outgoing stage or an incoming stage) which one of the first and second part of the speech memory that user data is to be switched.

In a specific embodiment of the invention, the control information in the control memory of the switch stage includes, for each time slot, first control data indicating to/from which time slot in a frame that user data is to be switched, and second control data representative of whether this user data is to be switched to the first frame or delayed a frame to the second frame.

The extended speech memory and the delay control unit may be provided in e.g. an incoming time switch stage or an outgoing time switch stage of the switch.

The inventive idea is particularly applicable to an arbitrary switch stage through which user data is switched between first time slots arriving to the stage and second time slots going out from the stage.

Since an extended speech memory is used without any additional separate memory unit, the number of memory accesses does not increase. In addition, a continuous monitoring of all the storage cells in the extended speech memory is obtained automatically, since all the cells are cyclically accessed in two frames; not only in connection with the delay of wideband connections but all the time, also in normal switching of narrowband connections.

By extending the speech memory, the delay values are easy to produce. The delay values are preferably in the form of a single bit per time slot, stored in the control memory of the switch stage in question.

The speech and control memories already available in the switch are optimally utilized. The solution is thus integrated in the switch structure itself such that only a minimum of extra equipment is required.

The invention has the following advantages:

frame and sequence integrity are preserved through a switch by using a minimum of extra equipment;

the delay mechanism for obtaining sequence and frame integrity just needs to be performed on one side of the switch, whereby the delay is minimized;

the number of memory accesses does not increase, since the idea is to extend an already available speech memory;

the solution is integrated in the switch structure itself;

a simple logic implementation of the delay control unit;

the extra control information in form of delay values can be realized by a single bit per time slot, facilitating the logic implementation and minimizing the extra memory space required in the control memory; and continuous monitoring of the cells of the extended speech memory is automatically obtained.

BRIEF DESCRIPTION OF THE DRAWINGS

The invention will now be described in more detail with reference to the drawings, in which:

FIG. 7b illustrates how the determined offset-variable influences the distribution of incoming time slot numbers and outgoing time slot numbers to the storage positions in the respective control memory;

DETAILED DESCRIPTION

User terminals (not shown), such as telephones and computers, generate and receive user data. It should be understood that "user terminals" also means internal equipment of a telecommunication system that generates and/or receives data, such as trunks, tone senders, tone receivers and conference units. The user data is made up of data words of e.g. 8 bits. User data to or from a group of user terminals appear by means of time multiplexing in one and the same so called multiplex in time intervals referred to as time slots, which in turn are part of larger time intervals, of 125 ms, referred to as PCM-frames or for simplicity just frames. User data generated by a user terminal and received by a (normally another) user terminal is associated with a so called connection that is unique for the user data. A multiplex thus includes user data from a plurality of connections. User data belonging to a connection is arranged in one or more time slots in each frame, where the timing relations of the time slots to their respective frames do not change between successive frames. The frames constitute time references by means of which the user data is associated to the connections.

Figure 1:
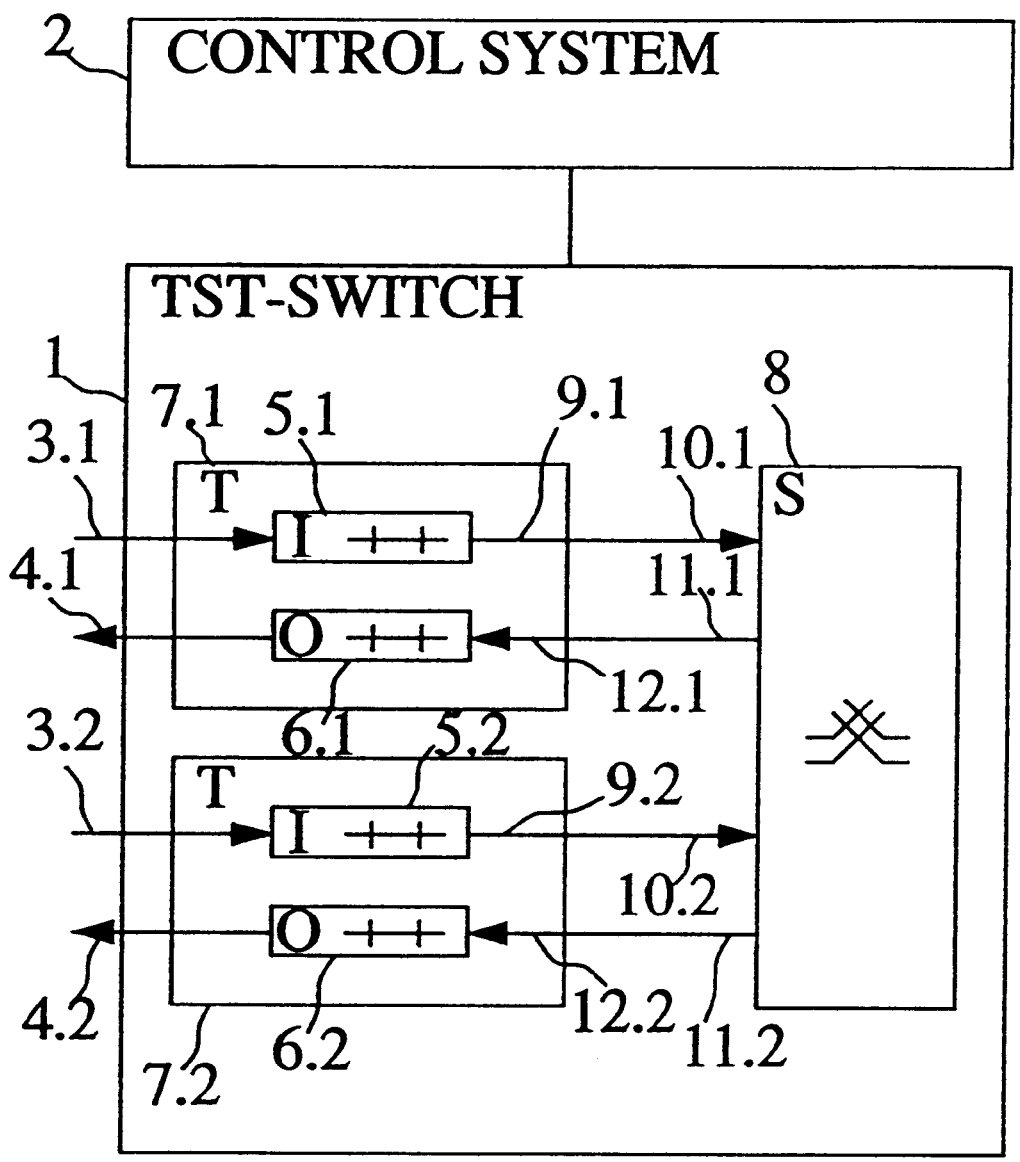
FIG. 1 schematically shows a circuit-switching switch having TST-structure and a control system.

In FIG. 1 there is shown a telecommunication system having a circuit-switching switch 1 of the type "Time-Space-Time", a so called TST-switch, and a control system 2 connected to the switch. The switch 1 has a number of inputs 3.n and a number of outputs 4.n. For simplicity, only two inputs 3.1, 3.2 and two outputs 4.1, 4.2 are shown. The switch 1 further includes incoming time switch stages 5.n and outgoing time switch stages 6.n, which in pairs form part of time switch modules 7.n, and a space switch stage 8. For simplicity only two incoming time switch stages 5.1, 5.2 and two outgoing time switch stages 6.1, 6.2 are shown.

Each input 3.n is connected to a respective incoming time switch stage 5.n. To each outgoing time switch stage 6.n a respective output 4.n is connected. An input 3.n and an output 4.n that are connected to an incoming time switch stage 5.n and an outgoing time switch stage 6.n, respectively, in the same time switch module 7.n are associated to multiplexes that normally belong to the same group of user terminals. Outputs 9.n from the incoming time switch stages are connected to inputs 10.n of the space switch stage 8.n. Outputs 11.n of the space switch stage are connected to inputs 12.n of the outgoing time switch stages 6.n. The connections appear more closely from the figure for outputs 9.1, 9.2, 11.1, 11.2 and inputs 10.1, 10.2, 12.1, 12.2.

Figure 2A:
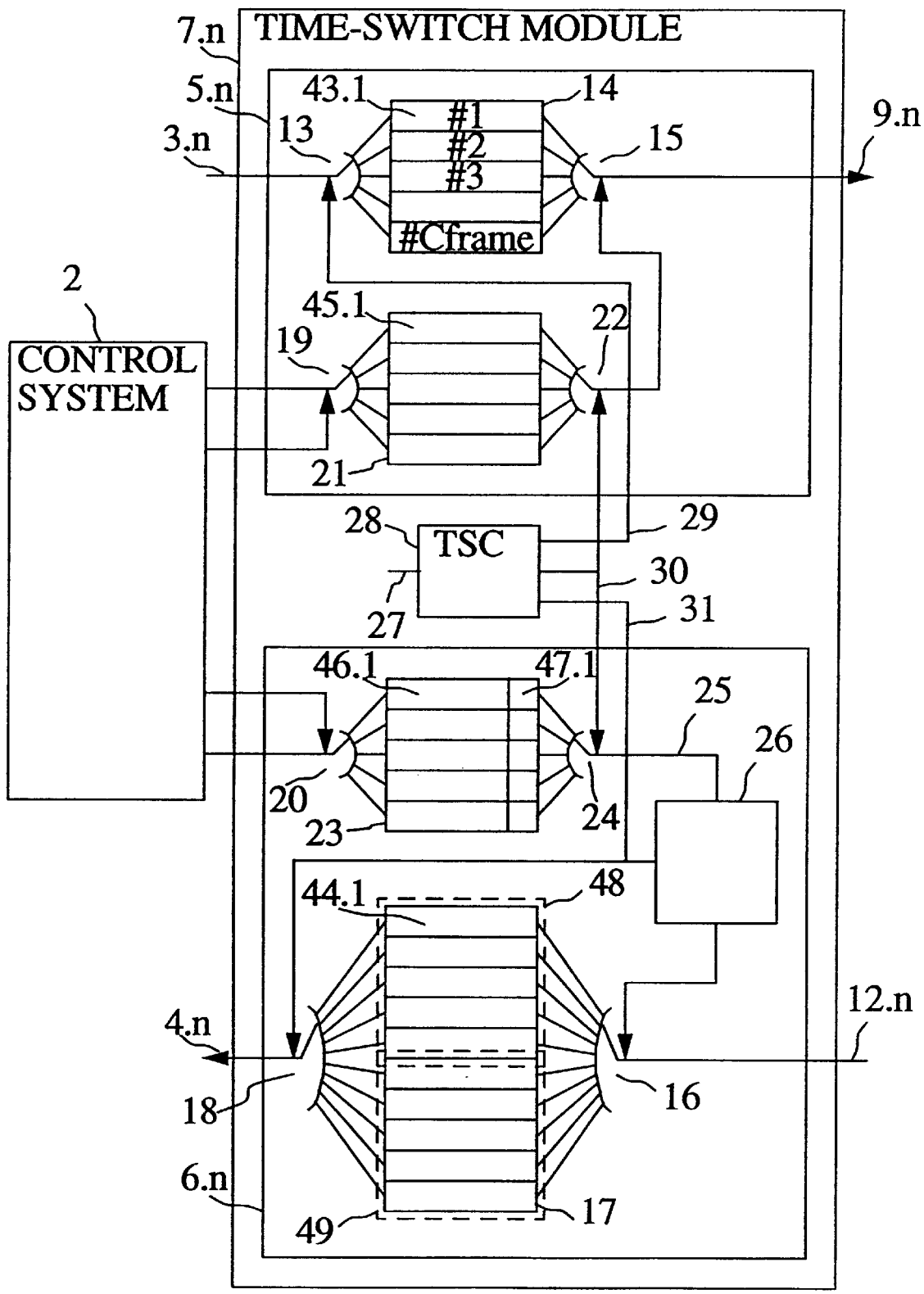
FIG. 2a shows a control system and a time switch module with an outgoing time switch stage according to the invention.

In FIG. 2a, a time switch module 7.n and the control system 2 are shown. The control system 2 is shown in general, whereas the time switch module 7.n is shown in more detail. The time switch module 7.n comprises an incoming time switch stage 5.n and an outgoing time switch stage 6.n. The input 3.n, on which a multiplex is arriving from a group of user terminals, is connected to an addressing unit 13, which in turn is connected to a speech memory 14. The speech memory 14 is connected to an addressing unit 15 that is connected to the output 9.n. The input 12.n is connected to an addressing unit 16, which in turn is connected to a speech memory 17. The speech memory 17 is connected to an addressing unit 18, which in turn is connected to the output 4.n. The control system 2 is connected to addressing units 19 and 20. The addressing unit 19 is connected to a control memory 21. The control memory 21 is connected to an addressing unit 22 The addressing unit 22 is connected to the addressing unit 15. The addressing unit 20 is connected to a control memory 23. The control memory 23 is in turn connected to an addressing unit 24. An output 25 of the addressing unit 24 is connected to a delay control unit 26 which in turn is connected to the addressing unit 16. On an input 27, a clock signal is coming from a per se known and therefore not shown clock for generating clock pulses, each of which corresponds to a time slot. The input 27 is connected to a time slot counter (TSC) 28. The time slot counter 28 is connected, via different outputs 29, 30 and 31, to the addressing units 13, 18, 22, 24 on one hand and to the delay control unit 26 on the other hand.

Figure 3:
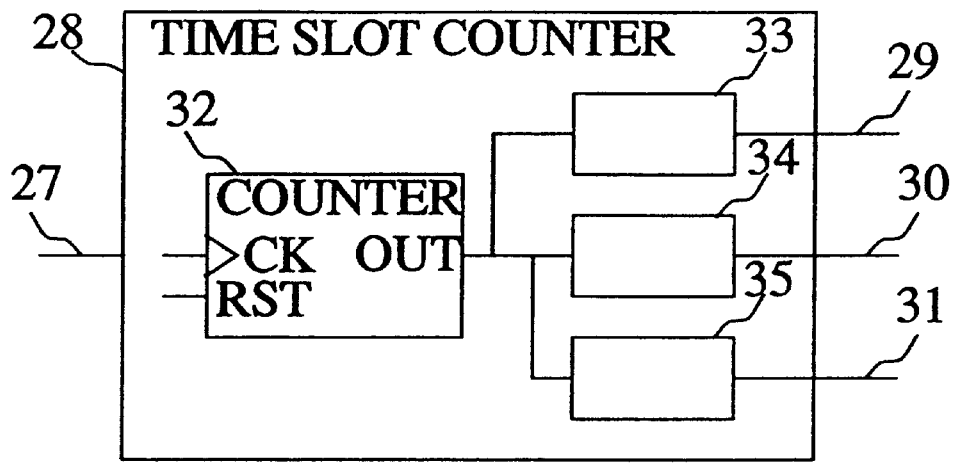
FIG. 3 shows a time slot counter circuit according to the invention.

The time slot counter 28 is shown in closer detail in FIG. 3. Except for a counter 32, per se known, the time slot counter 28 also includes means 33, means 34 and means 35 to which the counter 32 is connected. The output 29 is associated with means 33 and connected to the addressing unit 13. The output 30 is associated with means 34 and connected to the addressing unit 22 on one hand and to the addressing unit 24 on the other hand. The output 31 is associated with means 35 and connected to the addressing unit 18 on one hand and to the delay control unit 26 on the other hand. The function of means 33, 34 and 35 will be described later on.

Figure 4:
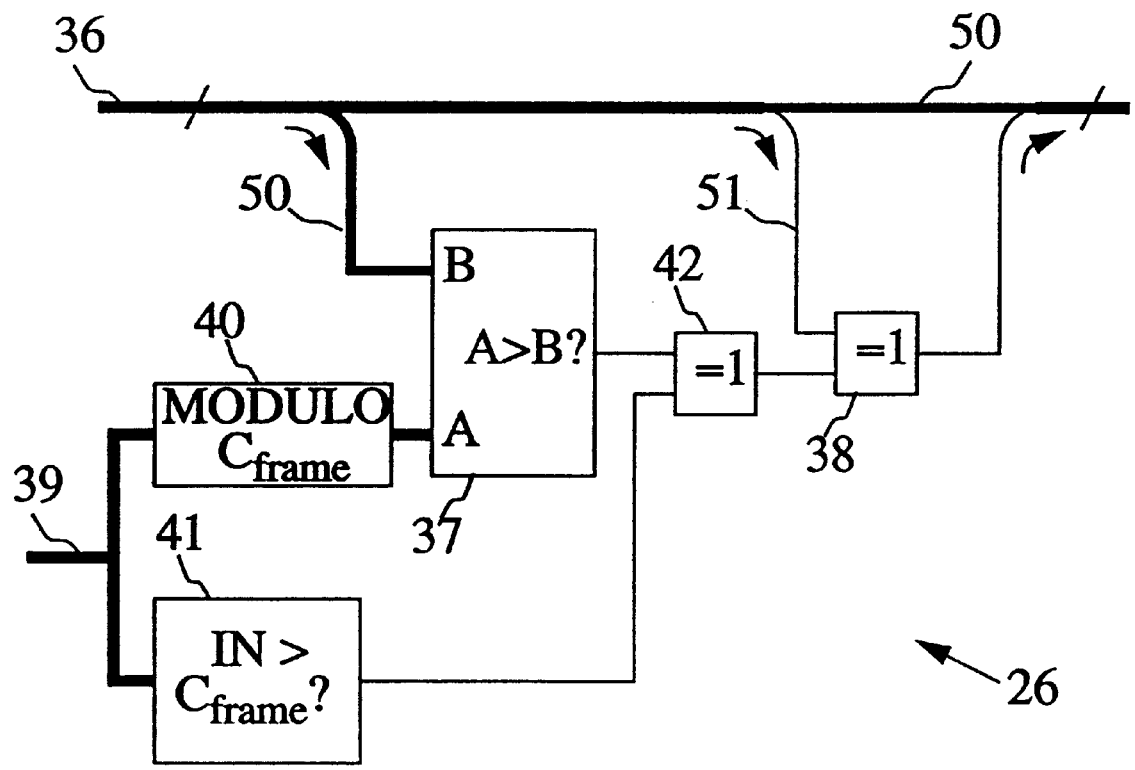
FIG. 4 shows a delay control unit according to the invention.

The delay control unit 26 is shown in more detail in FIG. 4. An input 36 to the delay control unit 26 from the output 25 of the addressing unit 24 is connected partly to a first input of a first comparator 37 on one hand, and partly to a first input of a first XOR-gate 38 on the other hand. An input 39 to the delay control unit 26 from the output 31 of means 35 in the time slot counter 28 is connected to means 40 on one hand and to a second comparator 41 on the other hand. Means 40 is connected to a second input of the first comparator 37. The first comparator 37 and the second comparator 41 are connected to a respective input of a second XOR-gate 42. The output from the second XOR-gate 42 is connected to a second input of the first XOR-gate 38. The first XOR-gate 38 is in turn connected to the addressing unit 16. Further, the output 25 from the addressing unit 24 is partly connected to the addressing unit 16 via the delay control unit 26.

Referring once again to FIGS. 1 and 2a. The user data in the respective connection is switched through the switch 1 from an input 3.n to a selectable output 4.n. In this respect, time switching in the time switch stages 5.n, 6.n as well as space switching in the space switch stage 8 are performed. The time switching means that user data arriving to a time switch stage 5.n, 6.n in given time slots relative to the frames are delayed and goes out of the time switch stage 5.n, 6.n in other time slots relative to the frames. In space switching, physical connections such as galvanic connections, are established from the inputs 10.n of the space switch stage to the outputs 11.n thereof. Space switching means that user data arriving to the space switch stage 8 on an input 10.n, e.g. 10.7 (not shown), goes out of the space switch stage 8 from a selectable output 11.n, e.g. 11.3 (not shown).

In switching user data belonging to a connection through the switch 1, the user data arrives in one or more given time slots in each frame, in so called incoming time slots, to an incoming time switch stage 5.n. In the incoming time slots, the user data is written into the speech memory 14 (FIG. 2a). The user data is read out of the speech memory 14 in other time slots, in so called internal time slots. The user data thus appearing in internal time slots is physically switched through the space switch stage 8 (FIG. 1) and written, in the internal time slots, into the speech memory 17 (FIG. 2a) of an outgoing time switch stage 6.n. In yet other time slots, so called outgoing time slots, the user data is read out of the speech memory 17.

The writing and reading of user data into and out of the speech memories 14, 17 are controlled by the addressing units 13, 15, 16, 18, which in turn are controlled by the time slot counter 28 and by the control system 2 through the addressing units 19, 20, 22, 24, the control memories 21, 23 and the delay control unit 26.

By means of the time slot counter 28, via the addressing unit 13, user data is cyclically written into storage positions 43.n in the speech memory 14 in a fixed sequence. The number of storage positions 43.n in the speech memory 14 is equal to the number of time slots in a frame. For simplicity, 5 storage positions 43.1–43.5 (however, only reference number 43.1 is shown in FIG. 2a) are shown, which correspond to 5 time slots in a frame. In reality however, the number of time slots in each frame is in general substantially greater, 512 as an example.

Each storage position 43.n represents one and only one unique time slot in each frame. User data arriving in a certain incoming time slot in a frame is consequently stored in a given storage position 43.n corresponding to the incoming time slot. The read-out of user data from the speech memory 17 into outgoing time slots is performed in a similar way. However, in the speech memory 17 there are twice as many storage positions 44.n as in the speech memory 14, i.e. as many storage positions 44.n as time slots in two frames. In the speech memory 17, 10 storage positions 44.1–44.10 (however, only reference number 44.1 is shown in FIG. 2a) are shown. The read-out of the user data is performed cyclically in a fixed sequence, one storage position 44.n each outgoing time slot such that each time slot represents a given outgoing time slot in every second frame. Consequently, user data can be switched to a time slot in an earliest possible outgoing frame or in a subsequently following outgoing frame.

User data that is assigned a storage position 44.n may selectively be delayed up to a time corresponding to two frames, depending on the value of the time slot counter 28 at the time for writing of the user data and in which storage position 44.n (the addressing information to the addressing unit 16) that writing of the user data is performed.

Now with reference to FIG. 3. The counter 32 that forms part of the time slot counter 28 cyclically occupies different states in a counter sequence such that different counter values are taken. The number of different counter values taken by the counter 32 is equal to the number of time slots in two frames. For each time slot in the two frames, a unique counter value is taken.

In means 33 and 35, values with a so called offset from the counter values are generated. In the respective means 33, 35 a value, called phase value, is generated for each counter value. Phase values obtained by means 33 have a difference compared to the counter values, representing a difference in phase between frames for internal time slots and frames for incoming time slots. Phase values obtained by means 35, at the output 31, have a difference compared to the counter values, representing a difference in phase between frames for outgoing time slots and frames for internal time slots. In the following, a phase value at the output 31 is also called an outgoing phase value. By means of the phase values, the switch handles reciprocal phase differences between frames for incoming time slots, frames for internal time slots and frames for outgoing time slots.

In means 33 and 34, modulo operations are performed. In means 34 a modulo operation between the counter value and a value representing the number of time slots in a frame is performed. By means of the modulo operation, a sequence of read-out counter values, in number equal to the number of time slots in a single frame but repeated twice for each counter sequence from the counter 32, is cyclically generated at the output 30 of means 34. In means 33 a modulo operation between the phase value and the value representing the number of time slots in a frame is performed. In that way, counter values similar to those from means 34, but with an offset, are generated at the output 29 of means 33. In practice, the modulo operations imply that the most significant bit of the counter values or phase values is eliminated.

By means of the control system 2 (FIGS. 1 and 2a), control information for controlling the switch 1 is generated. The control information comprises data words of e.g. 12 bits on one hand, and single bits on the other hand. The data words are written into storage positions 45.n and 46.n in the control memories 21 and 23, respectively, and the single bits are written into storage positions 47.n in the control memory 23, 1 bit per storage position 47.n, for controlling the switch 1. The bits in the storage positions 47.n are called delay values or delay bits in the following. The number of storage positions 45.n, 46.n, 47.n of respective type is equal to the number of time slots in a frame. The number of storage positions 45.n, 46.n, 47.n of each type shown is therefore equal to 5. By means of the time slot counter 28, via the addressing units 22, 24, control information is read out of a storage position 45.n, 46.n, 47.n in respective control memories 21, 23 in each time slot. Read-out is performed cyclically in a fixed sequence, one unique storage position 45.n, 46.n, 47.n for the respective time slot in a frame. Thus, each storage position 45.n, 46.n, 47.n implicitly corresponds to one and only one time slot in each frame.

Control information indicating from which storage position in the speech memory that user data is to be read, and in that way appear in internal time slots, is read out from the control memory 21 in each time slot. Control information indicating in which outgoing time slot in a frame that read-out of the user data is to be performed on one hand and if the user data is to be read out in a first possible frame or to be delayed an extra frame on the other hand, is read from the control memory 23 in each internal time slot.

The delay control unit 26 (FIG. 4) generates, from the control information from the control memory 23, via the addressing unit 24, and from information from the time slot counter 28, addressing information to the addressing unit 16 for writing the user data into the speech memory 17. In unit 26, the control information from the control memory 23 is compared to the information from the time slot counter 28. The outcome of the comparison results in user data being written, via the addressing unit 16, into storage positions 44.n either in a first part 48 of the speech memory 17 or in a second part 49 of the speech memory 17.

The delay control unit 26 receives the control information from the storage positions 46.n, 47.n in the control memory 23 at the input 36. The control information in the storage positions 46.n is directly applied to the addressing unit 16, and forms a first part 50 of the addressing information. The control information in the storage positions 46.n is also applied to the first input of the first comparator 37. The input 39 is provided with the phase values from the unit 35 which also controls the addressing unit 18 for reading out the user data into the outgoing time slots. Via unit 40, which performs a modulo operation between phase values from the unit 35 and a value representing the number of time slots in a frame, the second input of the first comparator 37 is provided with comparison values A representing outgoing time slots in each frame.

If, in a time slot, a comparison value A is greater than the control information, i.e. a value B from a storage position 46.n in the control memory 23, a bit which constitutes output data of the output of the first comparator 37 is set to "1".

On the other hand, if the comparison value A is less than or equal to the control information B, the bit is set to "0". The bit indicates, if it is set to "1", that i. if writing of user data takes place in the first part 48 of the speech memory 17, and read-out of user data also takes place in the first part 48 of the speech memory 17, or ii. if writing of user data takes place in the second part 49 of the speech memory 17, and read-out of user data also takes place in the second part 49 of the speech memory 17, then the user data is delayed more than one frame, otherwise not.

In the second comparator 41, the outgoing phase value is compared to a value representing the number of time slots in a frame. If the outgoing phase value is greater than the number of time slots in a frame, then a bit that constitutes output data of the output from the second comparator 41 is set to "1". On the other hand, if the outgoing phase value is less than or equal to the number of time slots in a frame, then the bit is set to "0". The bit indicates, if it is set to "1", that read-out of user data in the current time slot is performed from the second part 49 of the speech memory 17. If the bit is instead set to "0", it indicates that read-out of user data is performed from the first part 48 of the speech memory 17.

A first XOR-operation is performed in the second XOR-gate 42 between the bit from the first comparator 37 and the bit from the second comparator 41. The result of the first XOR-operation is a bit at the output of the second XOR-gate 42 which indicates, if it is set to "1", that writing of user data into the first part 48 of the speech memory 17 in the current time slot results in user data being delayed more than one frame. If it instead is set to "0", it indicates that writing into the second part 49 of the speech memory 17 in the current time slot results in user data being delayed more than one frame.

A second XOR-operation is performed in the first XOR-gate 38 between the bit from the output of the second XOR-gate 42 and a delay bit from a storage position 47.n. Delay bits from the storage positions 47.n constitute a second part 51 of the addressing information. A delay bit indicates, if it is set to "0", that user data is to be placed in that part of the speech memory 17, i.e. in the first part 48 or in the second part 49, that implies that user data is to be read out in time slots in a first possible frame for outgoing time slots. On the other hand, if the delay bit is set to "1", it indicates that user data is to be placed in that part of the speech memory 17 that implies that the user data is read out in time slots in a subsequently following frame.

A bit, so called delay information, at the output of the first XOR-gate 38 indicates, if it is set to "0", that user data is to be written into the first part 48 of the speech memory 17, whereas, if set to "1", it indicates that user data is to be written into the second part 49 of the speech memory 17. The delay information in form of a bit from the output of the first XOR-gate 38 controls the addressing unit 16 such that writing of the user data takes place either in the first part 48 of the speech memory 17 or in the second part 49 of the speech memory 17, based on the control information in the storage positions 46.n, 47.n in the control memory 23, and based on the outgoing phase value from the time slot counter 28.

In a so called narrowband connection, the user data for the connection appears in a single incoming time slot each frame, an internal time slot each frame and an outgoing time slot each frame. The control information for the narrowband connection is written into a storage position 45.n, and into a storage position 46.n, 47.n. The storage positions 45.n, 46.n, 47.n correspond to the internal time slots. The control information in the storage positions 45.n indicates from which incoming time slots that user data is to be switched to the internal time slots, i.e. out of which storage position 43.n that user data is to be read from the speech memory 14. The control information in the storage position 46.n, 47.n indicates to which outgoing time slots that user data is to be switched from the internal time slots, i.e. in which storage position 44.n that user data is to be written into the speech memory 17 such that read-out of the user data takes place in outgoing time slots for the connection. Consequently, the control information associated with a narrowband connection includes a value indicating in which incoming time slot the user data arrives to the switch, a value indicating in which internal time slot the user data is switched through the space switch stage, and a value indicating in which outgoing time slot the user data goes out of the switch. In the following, these values representing determined timing relations to the frames are called incoming time slot numbers, internal time slot numbers and outgoing time slot numbers, respectively. In addition to time slot numbers, the control information for a narrowband connection includes a constant delay value for each time slot, which is written into the storage position 47.n. The value indicates that the user data goes out of the switch in earliest possible frames.

In a so called wideband connection, the user data for the connection is switched in several incoming time slots each frame, in several internal time slots each frame and in several outgoing time slots each frame, in principle as several narrowband connections. Control information for controlling the switch for a wideband connection thus includes several incoming time slot numbers, several internal time slot numbers and several outgoing time slot numbers. In addition thereto, the control information includes delay values, one for each time slot in a frame for the wideband connection, which indicate whether user data is to appear in earliest possible frames or to be delayed an extra frame in the outgoing time switch stage. These values are written into the storage positions 47.n.

Figure 2B:
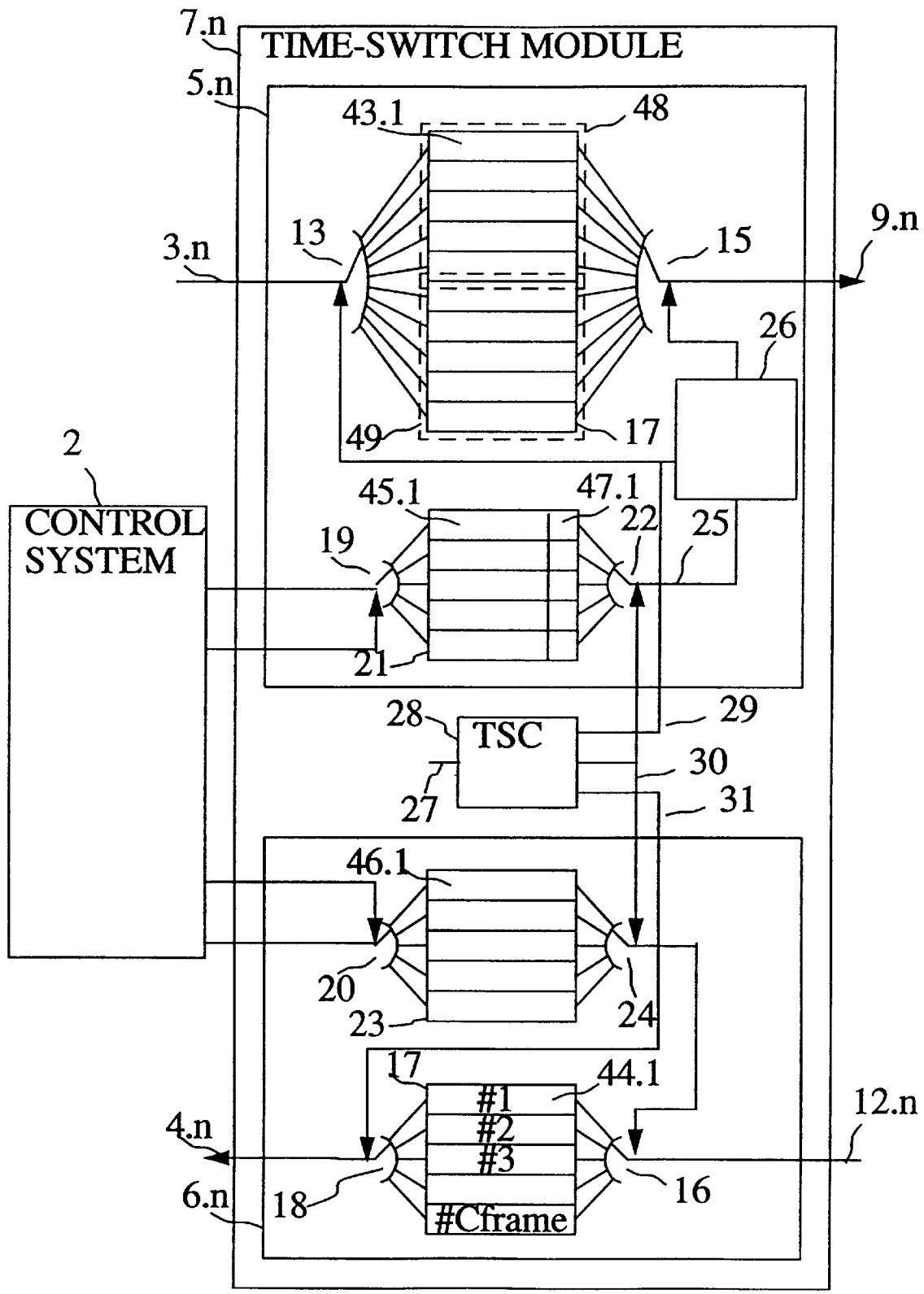
FIG. 2b shows a control system and a time switch module with an incoming time switch stage according to the invention.

It should be understood that this aspect of the invention also is applicable to the incoming time switch stage. With reference to FIG. 2b, there is shown a switch structure in form of a time switch module 7.n to which a control system 2 is connected. The same reference numerals as in FIG. 2a are used to designate the same or corresponding elements. The difference compared to FIG. 2a is that the invention is applied to the incoming time switch stage 5.n. The speech memory 14 is extended to include two parts 48 and 49 (for simplicity, the same reference numerals as in FIG. 2a are used), each of which contains storage positions that in number correspond to the number of time slots in a frame. The control memory 21 is also extended such that it includes control information in the storage positions 45.n and control information in form of delay values in the positions 47.n. The control information from the control memory 21 in the incoming time switch stage 5.n is fed, via the addressing unit 22, to the delay control unit 26 which, in this embodiment, is connected to the addressing unit 15 to control the read-out of user data from the extended speech memory 14. The delay control unit 26 functions in a way corresponding to that of FIG. 2a, and here the time slot counter information at the output 29 corresponds to the information from means 35 in FIG. 2a. In particular, the delay control unit generates delay information that controls, for each internal time slot, from which of the first part 48 and the second part 49 of the speech memory 14 that user data is to be switched to the internal time slot. It should be noted that according to FIG. 2a, the delay control unit 26 controls the storage of user data in the extended speech memory 17, whereas according to FIG. 2b, the delay control unit 26 controls the read-out of user data from the extended speech memory 14. In FIG. 2b, the outgoing time switch stage 6.n includes a control memory 23 with control information in storage positions 46.n, a speech memory 17 with storage positions 44.n, in number equal to the number of time slots in a frame. The control information in the control memory 23 directly controls the storage of user data in the speech memory 17, and time slot counter information corresponding to that generated by means 33 in FIG. 2a controls the cyclical read-out of user data from the speech memory 17.

In practice, it should be understood that this aspect of the invention is applicable to an arbitrary time switch stage for delaying some of the user data through the time switch stage. Consider an arbitrary time switch stage used for switching user data between a first type of time slots and a second type of time slots. As an example, the first time slots may be incoming time slots and the second time slots may be internal time slots. Just as well, the first time slots may be internal time slots and the second time slots outgoing time slots. The speech memory in the time switch stage in question is extended to include two parts, each having storage positions corresponding to a frame, and the control memory of the stage is extended to include control information in form of delay values as well. Furthermore, a delay control unit is provided for generating delay information that controls, for each time slot, to/from (depending on whether the speech memory is provided in an outgoing stage or an incoming stage) which part of the speech memory that user data is to be switched.

It should however be noted that in e.g. broadcasting applications, the invention is applied to the outgoing stage so as to obtain sequence and frame integrity for all subscribers. In that way, the delay control can be performed for each outgoing wideband connection.

Throughout the disclosure, speech memories should be considered capable of storing information relating to speech traffic as well as data traffic.

In the following description, incoming time slot numbers for a wideband connection are designated by a vector $t_{in}$ [0,1,2, ... W−1]. W designates the number of time slots for the wideband connection in each frame. Correspondingly, internal time slot numbers are designated by a vector $t_{int}$ [0,1,2, ... W−1], and outgoing time slot numbers by a vector $t_{out}$ [0,1,2, ... W−1]. For simplicity, the incoming time slot numbers appear in consecutive order in the vector $t_{in}$ [0,1,2, ... W−1]. This order is assumed to be the same as the order in which user data is arranged into incoming time slots.

According to a method for distributing user data belonging to a wideband connection onto internal time slots and outgoing time slots such that Time Slot Sequence Integrity (TSSI) and Time Slot Frame Integrity (TSFI) are preserved, i.e. such that a reciprocal time order between data words that constitute the user data is maintained in switching through the switch, and such that data words appearing in incoming time slots in one and the same frame appear in outgoing time slots in the same frame, an algorithm is used in which the vectors $t_{in}$ [0,1,2 ... W−1], $t_{int}$ [0,1,2, ... W−1] and $t_{out}$[0,1,2, ... W−1] constitute input data. In addition thereto, the algorithm starts from input data in form of a constant $\Delta_{in}$ which designates a difference in phase between frames for incoming time slots and frames for internal time slots, a constant $\Delta_{ut}$ which designates a difference in phase between frames for internal time slots and frames for outgoing time slots, and a constant $C_{frame}$ designating the number of time slots in a frame. The number of time slots W in a frame that belong to the wideband connection is less than or equal to the total number $C_{frame}$ of time slots in a frame. Based on the input data, the algorithm determines distribution information in form of storage positions 45.n, 46.n in the control memories 21, 23 for storing the incoming and the outgoing time slot numbers, respectively, and the storage of the incoming and outgoing time slot numbers in the control memories 21 and 23, respectively, is taken care of in accordance with this distribution information. Furthermore, the algorithm determines distribution information in form of storage positions 47.n, and delay values for writing into the control memory 23 in accordance with this distribution information. Furthermore, the delay values are written into the control memory 23 in the storage positions 47.n in accordance with the distribution information.

In short, the different types of information that are utilized according to the invention may be summarized in the following simplified manner:

control information includes time slot numbers on one hand and delay values on the other hand;

distribution information includes storage positions in the respective control memories for storing the above control information (incoming time slot numbers are stored in 45.n, outgoing time slot numbers are stored in 46.n and delay values are stored in 47.n); and delay information is made up of the information that is generated by the delay control unit and that controls to/from which one of the first and second part of the speech memory that user data is to be switched.

The time slot numbers in the vectors $t_{in}$ [0,1,2, ... W−1], $t_{int}$ [0,1,2, ... W−1] and $t_{out}$ [0,1,2, ... W−1] are generated in the same manner as the time slot numbers for several narrowband connections. The incoming time slot numbers and the outgoing time slot numbers are per se given for a connection by the user terminals between which user data is switched in the connection. The time slot numbers for the vector $t_{int}$ [0,1,2, ... W−1] are determined such that no conflict arises in the space switch stage 8. User data that arrives to different incoming time switch stages 5.n and that is to be switched through one and the same outgoing time switch stage 6.n are separated in time such that no conflict occurs in the space switch stage 8. The user data is placed by the incoming time switch stages 5.n into internal time slots in the space switch stage 8. A conflict would arise e.g. if user data for several connections to be switched through one and the same outgoing time switch stage 6.n appear in the same time slots in the space switch stage 8. The time slot numbers in the vectors $t_{in}$ [0,1,2, ... W−1], $t_{int}$ [0,1,2, ... W−1] and $t_{out}$ [0,1,2, ... W−1] are generated in a known manner, and therefore not explained in more detail.

The method for distributing time slot numbers and for determining and distributing delay values will now be described with reference to FIGS. 5–11.

Figure 5:
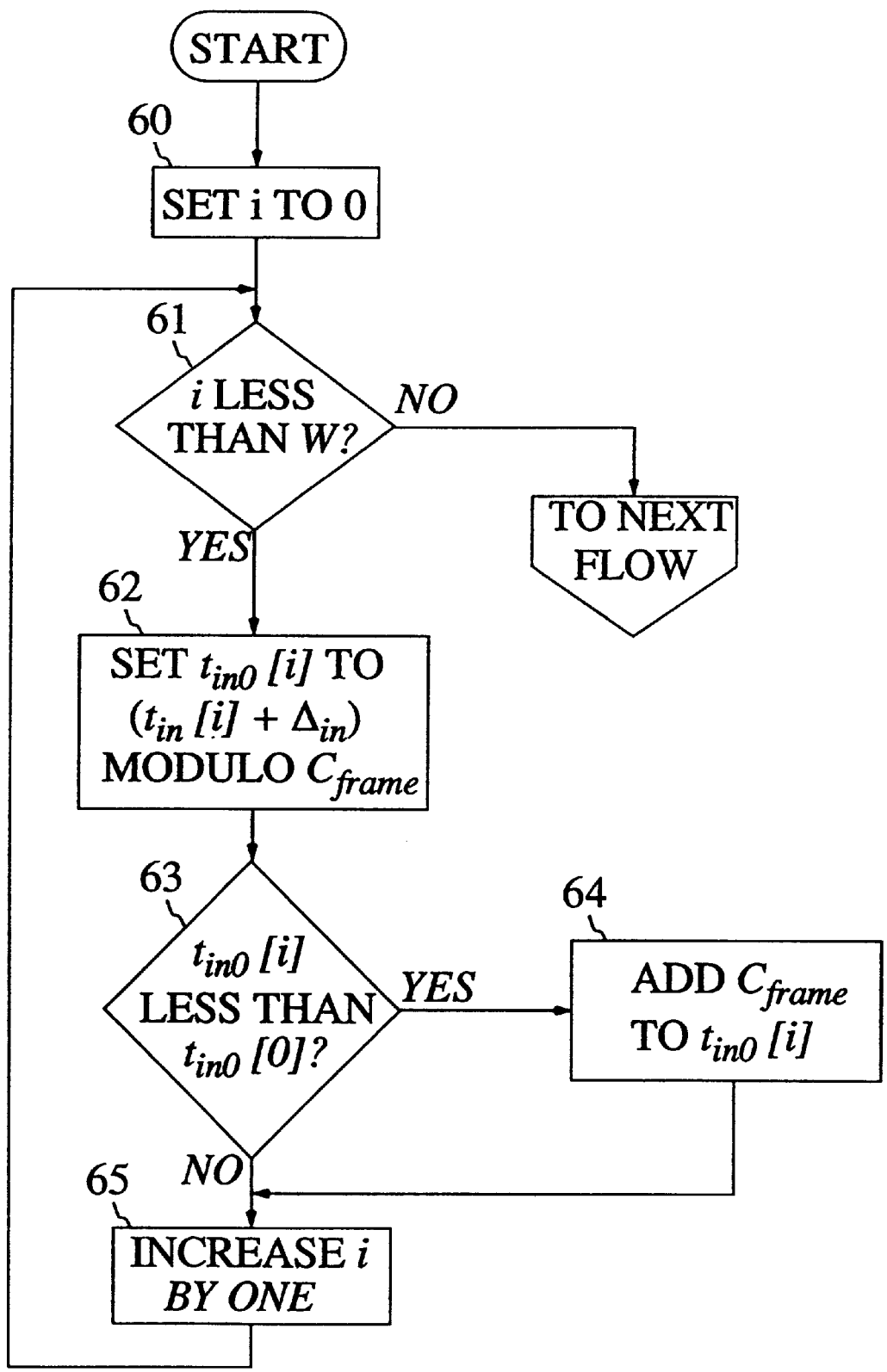
FIG. 5 shows a flow diagram according to the invention describing how incoming time slot numbers are normalized against a time phase of frames for internal time slots.

1. Normalize incoming time slot numbers against a time phase of frames for internal time slots, generating a vector $t_{in0}$ [0,1,2, ... W−1]. The normalization means that the time slot numbers are regenerated such that the incoming time slot numbers are given relative to frames for the internal time slots. With reference to FIG. 5, determine values of the vector $t_{in0}$ [0,1,2, ... W−1]. First, initiate a help variable i to 0, i.e. set i=0, see box 60. Next, iterate a sequence including the following steps:

i. Compare the help variable i to W. Interrupt the iteration when i is not less than W, see option box 61.

ii. Store ($t_{in}$ [i]+$\Delta_{in}$) modulo $C_{frame}$ in $t_{in0}$ [i], see box 62.

iii. Compare $t_{in0}$ [i] to $t_{in0}$ [0], see box 63. If $t_{in0}$ [i] is less than $t_{in0}$ [0], add $C_{frame}$ to $t_{in0}$ [i], see box 64.

iv. Add 1 to the help variable i, see box 65.

Values of the vector $t_{in0}$[0,1,2, ... W−1] that exceed the value of $C_{frame}$ indicate that user data belonging to the values is associated with a later frame than user data for which values of the vector $t_{in0}$[0,1,2, ... W−1] are less than the value of $C_{frame}$. The internal time slot numbers are given by $t_{in0}$[n] modulo $C_{frame}$.

2. Determine a value of a variable δ The variable δ is an offset-variable which indicates a value that controls the distribution of the user data onto the internal time slots. This so called offset-value decides how user data in the incoming time slots that belong to the wideband connection is to be distributed onto the internal time slots. The way in which the offset-value affects the distribution of the user data will be described in more detail in connection to FIG. 7b. First, create a help vector $t_{int0}$[0,1,2, ... W−1] so that the values in the vector $t_{int}$[0,1,2, ... W−1] are not corrupted. The values of the help vector are given by $$\begin{bmatrix} t_{int0}[0] \\ t_{int0}[1] \\ \ldots \\ t_{int0}[W-1] \end{bmatrix} = \begin{bmatrix} t_{int}[0] \\ t_{int}[1] \\ \ldots \\ t_{int}[W-1] \end{bmatrix}$$

Figure 6:
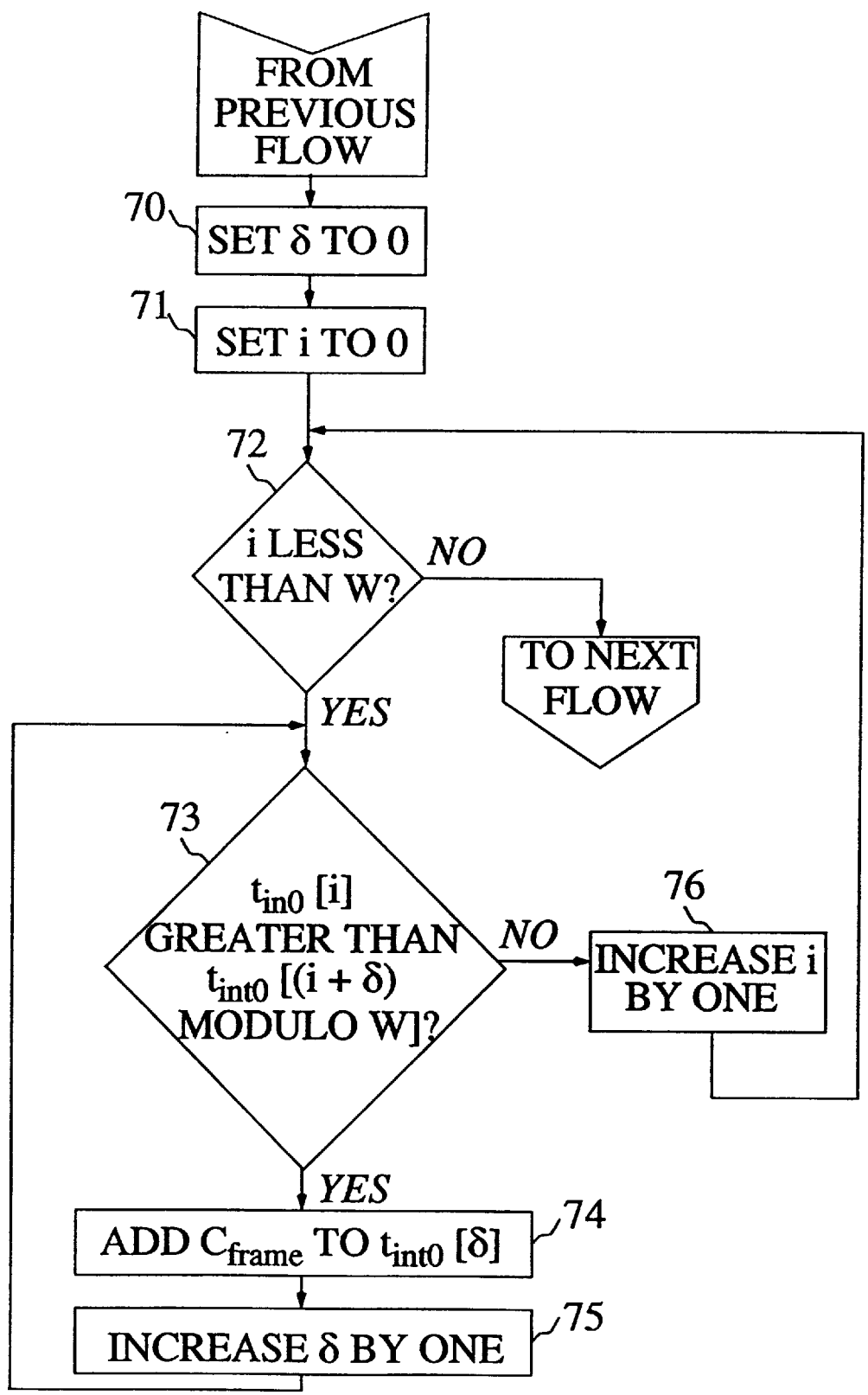
FIG. 6 shows a flow diagram describing how an offset-variable is determined according to the invention.
Figure 7A:
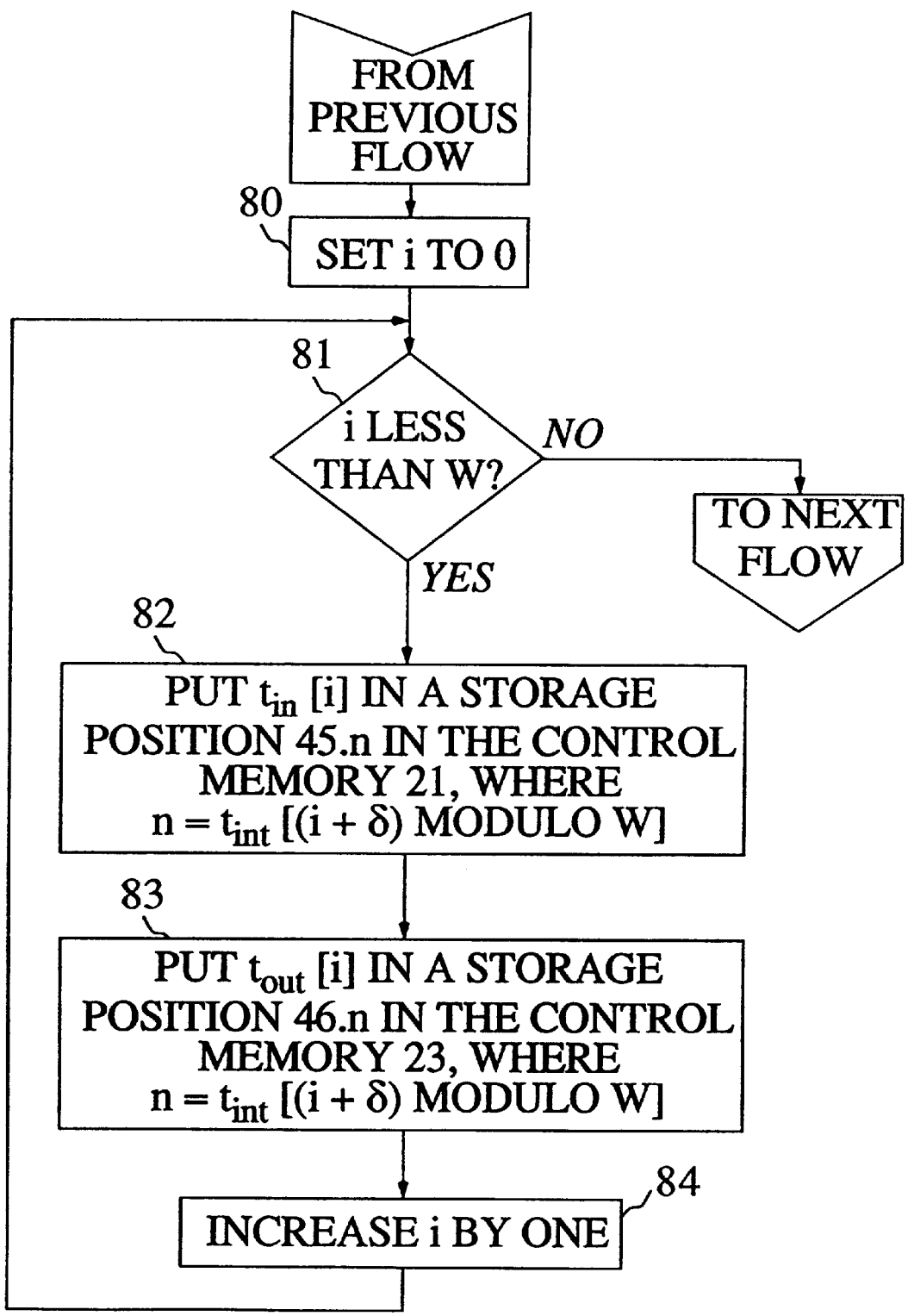
FIG. 7a shows a flow diagram according to the invention describing how distribution information in form of storage positions in the control memories is determined by using the offset-variable.

The values of the vector $t_{int}[0,1,2,\ldots W-1]$ are thus copied to the vector $t_{int0}[0,1,2,\ldots W-1]$. In the following the method manipulates values in the vector $t_{int0}[0,1,2,\ldots W-1]$, whereas the values in the vector $t_{int}[0,1,2,\ldots W-1]$ are kept intact. With reference to FIG. 6, determine the offset-variable δ by first initiating it to 0, i.e. set δ=0, see box 70. Also, initiate a help variable i to 0, i.e. set i=0, see box 71. Iterate a sequence in which the following steps are included:
  i. Compare the help variable i to W. Interrupt the iteration when i is not less than W, see box 72.
  ii. Iterate a sequence in which the following steps are included:
    ii.i Compare $t_{in0}[i]$ to $t_{int0}[(i+δ)$ modulo W]. Interrupt the iteration when $t_{in0}[i]$ is not greater than $t_{int0}[(i+δ)$ modulo W], see box 73.
    ii.ii Add $C_{frame}$ to $t_{int0}[δ]$, see box 74.
    ii.iii Add 1 to the variable δ, see box 75.
  iii. Add 1 to the help variable i, see box 76.
3. Determine distribution information that is made up of storage positions 45.n, 46.n in the control memories 21 and 23, respectively, by using the offset-variable δ, and store the control information in the storage positions 45.n, 46.n in the control memories 21, 23 in accordance with the distribution information. With reference to FIG. 7a, initiate a help variable to 0, i.e. set i=0, see box 80. Iterate a sequence in which the following steps are included:
  i. Compare the help variable i to W. Interrupt the iteration when i is not less than W, see box 81.
  ii. Store $t_{in}[i]$ in the control memory 21 in storage position 45.n, where n=$t_{int}[(i+δ)$ modulo W], see box 82.
  iii. Store $t_{out}[i]$ in the control memory 23 in storage position 46.n, where n=$t_{int}[(i+δ)$ modulo W], see box 83.
  iv. Add 1 to the variable i, see box 84.

FIG. 7b is a schematic diagram showing how different values (0,1 and 2) of the offset-variable δ controls, for each incoming time slot number $t_{in}[i]$ and for each outgoing time slot number $t_{out}[i]$, in which one of the storage positions 45.n and 46.n, respectively, that are given by the internal time slot numbers $t_{int}[0,1,2,\ldots W-1]$ that the incoming time slot number $t_{in}[i]$ and the outgoing time slot number $t_{out}[i]$, respectively, are to be stored. For simplicity, consider 4 time slot numbers for a wideband connection, i.e. W=4.

For δ=0, the incoming time slot numbers $t_{in}[0]$, $t_{in}[1]$, $t_{in}[2]$ and $t_{in}[3]$ will be stored in the positions 45.$t_{int}[0]$, 45.$t_{int}[1]$, 45.$t_{int}[2]$ and 45.$t_{int}[3]$, respectively. The storage positions 45.n are determined by the internal time slot numbers that have been assigned to the connection and where the index values directly correspond to the index values associated with the incoming time slot numbers. The same applies to the outgoing time slot numbers and their storage positions 46.n.

For δ=1, the storage positions 45.n and 46.n are determined by the internal time slot numbers that have been assigned to the connection and where the index values are displaced one position relative to the index values associated with the incoming time slot numbers.

For δ=2, the index displacement is two positions.

The steps 1 and 2, and the determination of the storage positions 45.n in step 3 with the following storage of the incoming time slot numbers for the wideband connection in the storage positions 45.n assures that sequence integrity between incoming and internal time slots is preserved. In addition, the offset-value determined in step 2 allows the delay in the time switching between incoming and internal time slots to be minimized. A corresponding procedure is applicable to the time switching between internal and outgoing time slots such that sequence integrity and minimized time switching delay are obtained.

If, in the switching of user data through the complete TST-switch, it is desired to preserve both sequence integrity and frame integrity, the steps 1–7 will be performed, of which the steps 4–7 will be described in the following.

Figure 8:
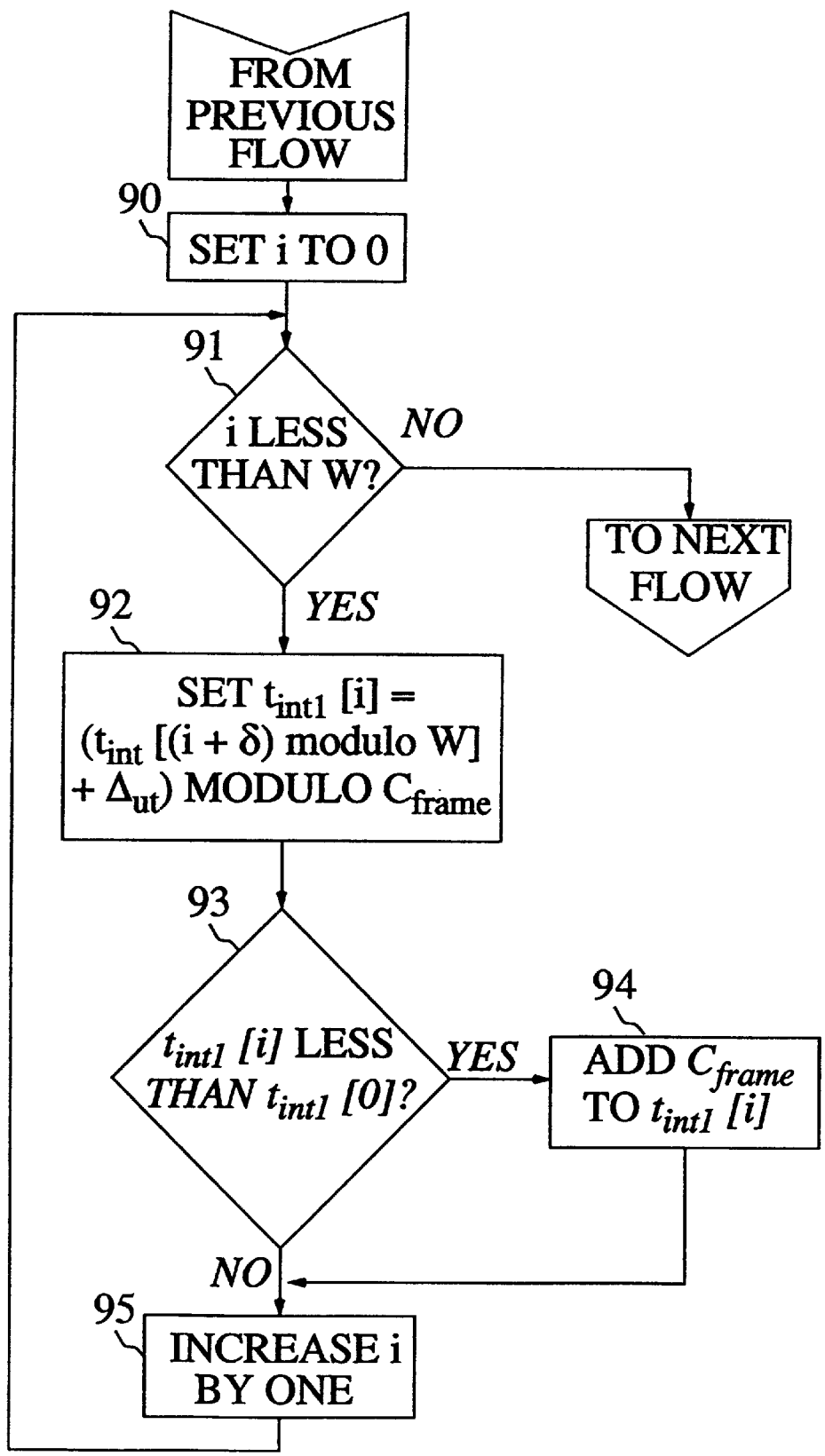
FIG. 8 shows a flow diagram according to the invention describing how internal time slots are normalized against a time phase of frames for outgoing time slots.
Figure 9:
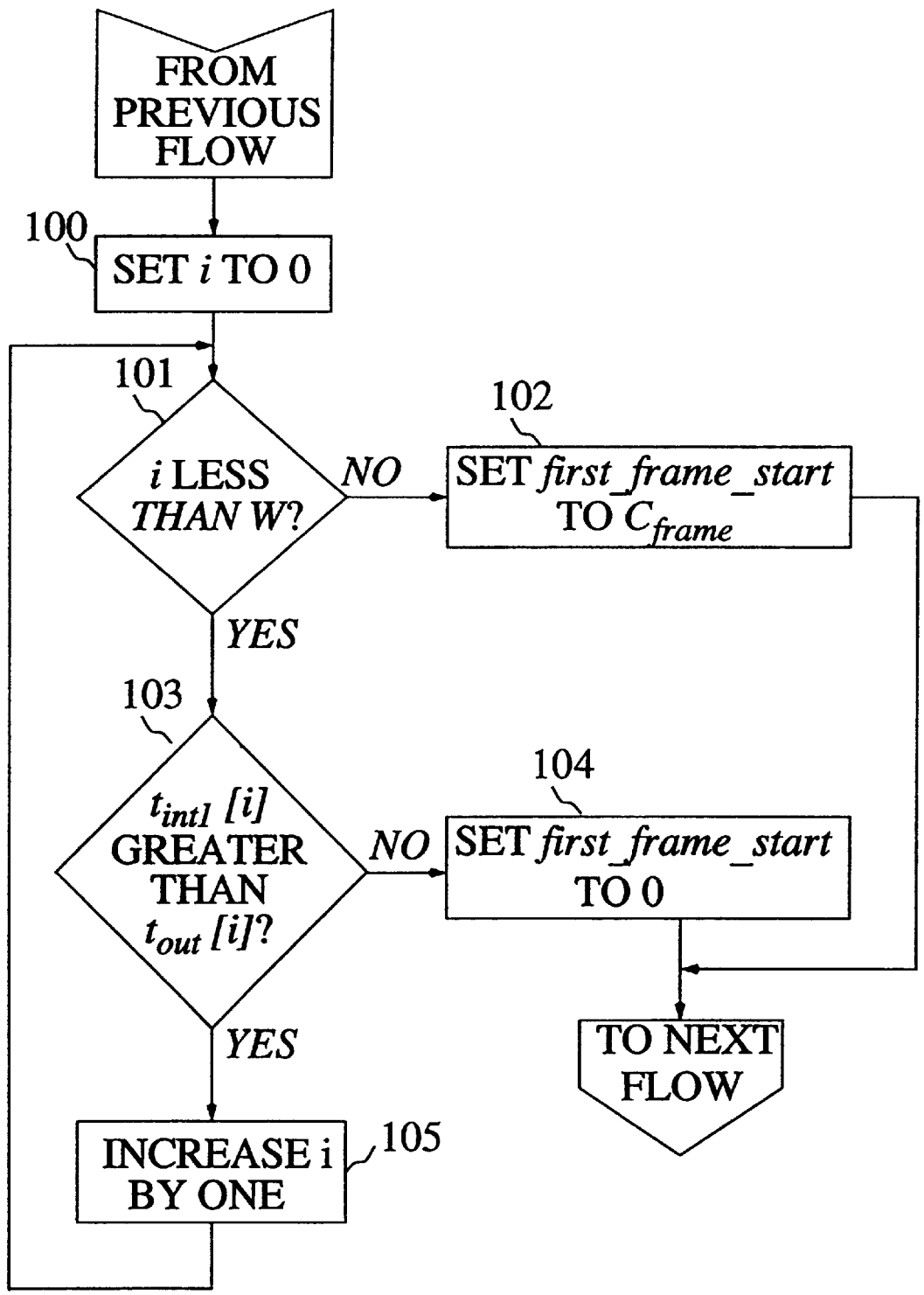
FIG. 9 shows a flow diagram according to the invention describing how a base value is determined.
Figure 10:
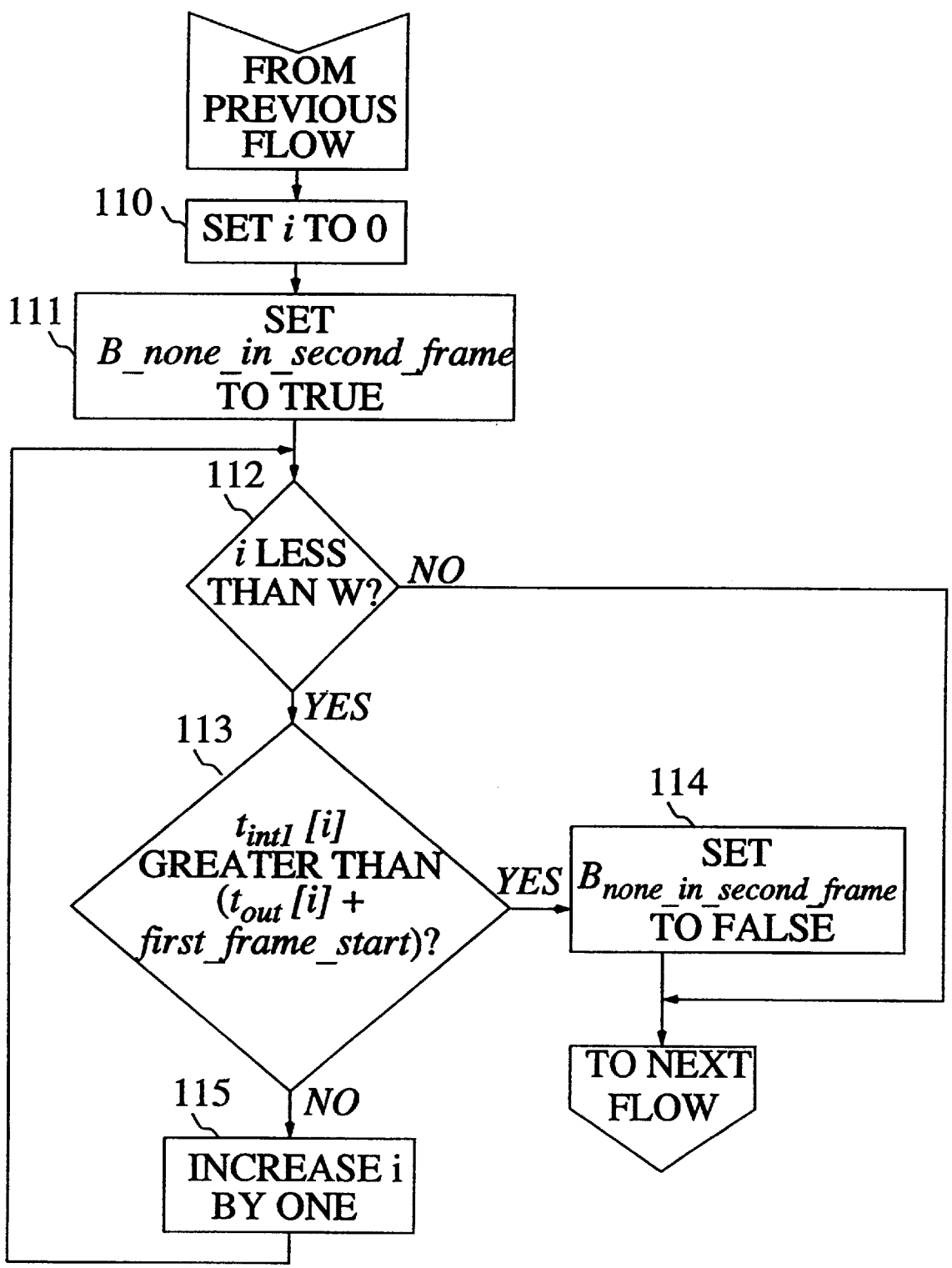
FIG. 10 shows a flow diagram according to the invention describing a determination of whether any time slot is associated with a subsequently following frame relative to the frame represented by the base value.

4. Normalize the internal time slot numbers, considering how they are distributed in accordance with the distribution information by the offset variable δ, against a time phase of frames for outgoing time slots, generating a vector $t_{int1}[0,1,2,\ldots W-1]$. The normalization means that the time slot numbers are regenerated such that the internal time slots are indicated relative to frames for the outgoing time slots. With reference to FIG. 8, determine values of the vector $t_{int1}[0,1,2,\ldots W-1]$. First, initiate a help variable i to 0, i.e. set i=0, see box 90. Next, iterate a sequence including the following steps:
  i. Compare the help variable i to W. Interrupt the iteration when is not less than W, see option box 91.
  ii. Store $(t_{int}[(i+δ)$ modulo W]+$Δ_{ut}$) modulo $C_{frame}$ in $t_{int1}[i]$, see box 92.
  iii. Compare $t_{int1}[i]$ to $t_{int1}[0]$, see box 93. If $t_{int1}[i]$ is less than $t_{int1}[0]$, add $C_{frame}$ to $t_{int1}[i]$, see box 94.
  iv. Add 1 to the help variable i, see box 95.
5. Determine a value of a variable first$_{13}$frame_start. The value is called base value or frame value and indicates an earliest possible frame in which read-out of user data into outgoing time slots would take place if TSFI is not taken into account. The value of the variable first_frame_start is either 0 or $C_{frame}$. With reference to FIG. 9, set a help variable i to 0, see box 100. Next, iterate a sequence including the following steps:
  i. Compare the help variable i to W. When i is not less than W, interrupt the iteration, see option box 101, and set a variable first_frame_start to $C_{frame}$, see box 102.
  ii. Compare $t_{int1}[i]$ to $t_{out}[i]$, see option box 103. If $t_{int1}[i]$ is not greater than $t_{out}[i]$, set the variable first_frame_start to the value zero, see box 104.
  iii. Add 1 to the help variable i, see box 105.
6. Determine whether any time slot is associated with a subsequently following frame relative to the frame represented by the determined base value (frame value). In this way, it is determined whether or not user data belonging to certain outgoing time slot numbers have to be delayed an extra frame. With reference to FIG. 10, set a help variable i to 0, see box 110, and set a variable B_none_in_second_frame to the value TRUE, see box 111. Next, iterate a sequence including the following steps:
  i. Compare the help variable i to W. Interrupt the iteration when i is not less than W, see option box 112.
  ii. Compare $t_{int1}[i]$ to ($t_{out}[i]$+first_frame_start), see option box 113. If $t_{int1}$ is greater than ($t_{out}[i]$+first_frame_start), set the variable B_none_in_ second_frame to the value FALSE, and then interrupt the iteration, see box 114.

iii. Add 1 to the help variable i, see box 115.

Figure 11:
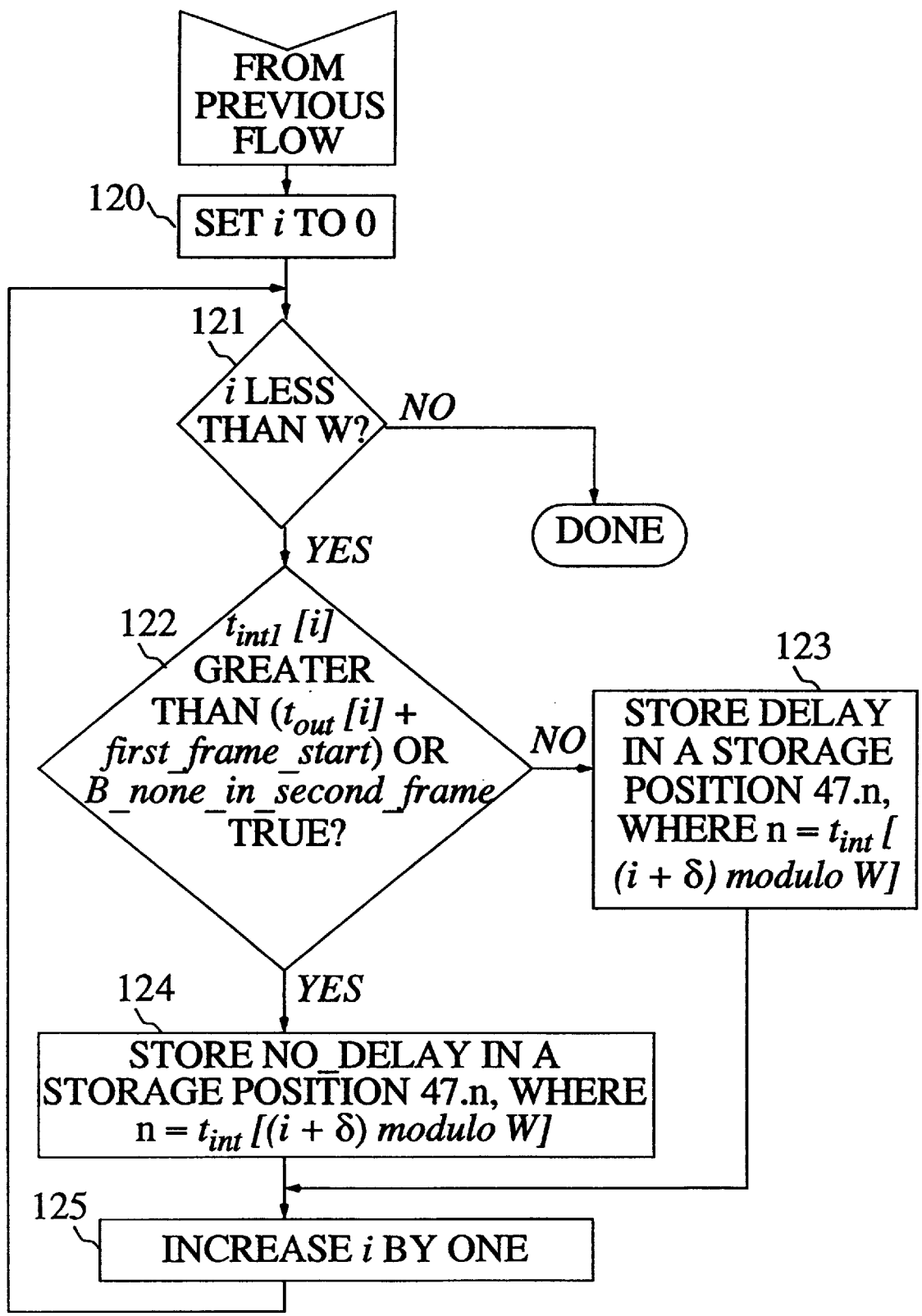
FIG. 11 shows a flow diagram according to the invention describing a determination of control information in form of delay values for respective time slot numbers in frames for outgoing time slots.

7. Determine control information in form of delay values DELAY/NO_DELAY and write these into the storage positions 47.n in the control memory 23. With reference to FIG. 11, set a help variable i to 0, see box 120. Next, iterate a sequence including the following steps:

i. Compare the help variable i to W. Interrupt the iteration when i is not less than W, see option box 121.

ii. Compare $t_{int1}$ [i] to ($t_{out}$ [i]+first_frame_start), see box 122. If $t_{int1}$ [i] greater than ($t_{out}$ [i]+first_frame_start), and the variable B_none_in_second_frame has the value FALSE, store the value DELAY in a storage position 47.n, where n=$t_{int}$[(i+δ) modulo W], see box 123. DELAY indicates that user data is delayed an extra frame in an outgoing time switch stage 6.n, i.e. DELAY=1. If $t_{int1}$ [i] is greater than ($t_{out}$ [i]+first_frame_start), or the variable B_none_in_second_frame has the value TRUE, store the value NO_DELAY in a storage position 47.n, where n=$t_{int}$[(i+δ) modulo W], see box 124. NO_DELAY indicates that user data is not delayed an extra frame in an outgoing time switch stage 6.n, i.e. NO_DELAY=0.

iii. Add 1 to the help variable i, see box 125.

Preferably, the algorithm is implemented in software executing in a processor such a as microprocessor. This microprocessor (not shown) is by way of example arranged in the control system. The above description of the algorithm is drawn up such that corresponding programming code in programming languages such as C++ will be readily implemented.

In the following, there is shown an illustrative example, according to the invention, of how to configure a TST-switch for a wideband connection such that both sequence and frame integrity are preserved through the switch. Consider a wideband connection of three channels. Thus W=3. The total number of time slots in a frame $C_{frame}$ is 512. The control system 2 receives a request for establishing the three channel wideband connection from the incoming time slots $t_{in}$={15, 243, 372} to the outgoing time slots $t_{in}$={36, 167, 221}. Idle internal time slots for switching data are $t_{int}$={183, 327, 378}. The difference in phase between frames for incoming time slots and frames for internal time slots is $\Delta_{in}$=13. The difference in phase between frames for internal time slots and frames for outgoing time slots is $\Delta_{ut}$=−276.

Figure 12:
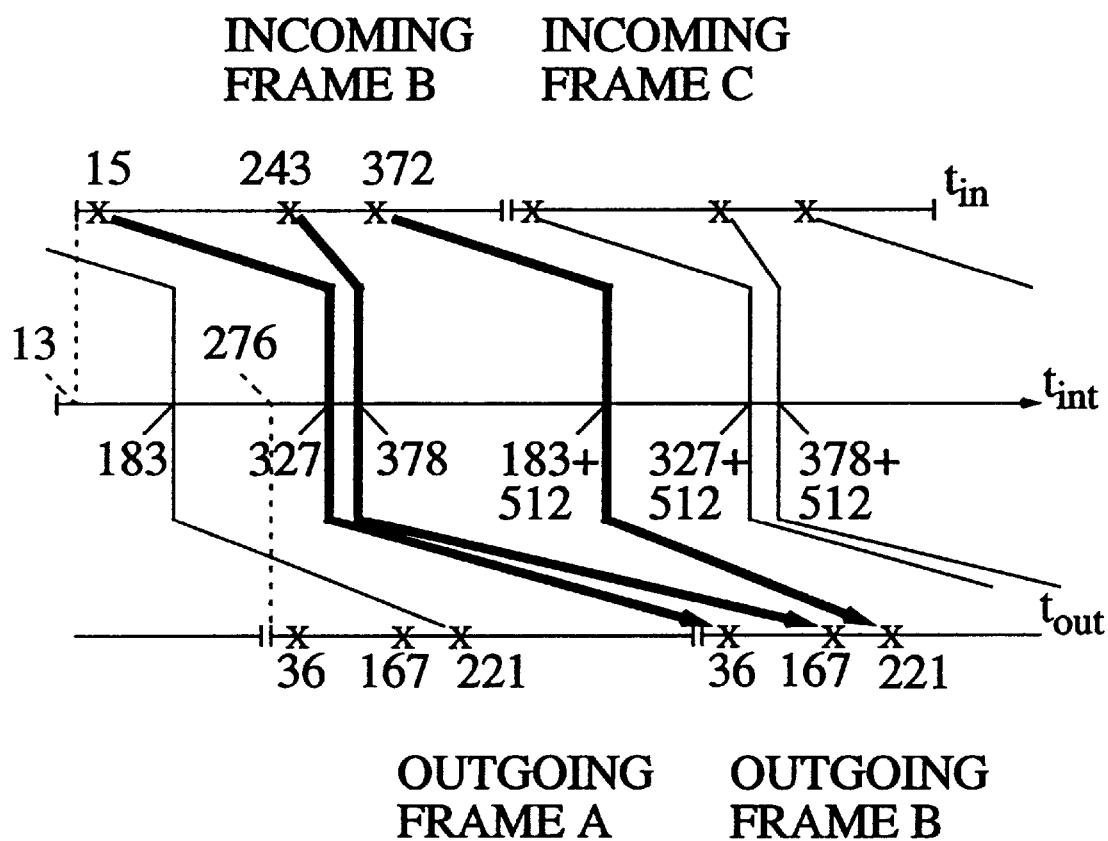
FIG. 12 is a diagram of frames of incoming time slots, internal time slots and frames of outgoing time slots, schematically showing how user data in the incoming time slots are distributed onto the internal time slots and the outgoing time slots according to an illustrative example of a set-up of a wideband connection.

FIG. 12 is a diagram of frames of incoming time slots, internal time slots and frames of outgoing time slots schematically showing how user data in the incoming time slots are distributed onto the internal time slots and the outgoing time slots according to this example. The phase differences $\Delta_{in}$=13 and $\Delta_{out}$=−276 are indicated by dotted lines. The time slot numbers 15, 243, 372 indicate positions in an incoming frame, whereas the positions of the X:s indicate the time instances when the time slots arrive relative to the time axis $t_{int}$. The time slot numbers 36, 167, 221 indicate positions in an outgoing frame, whereas the positions of the X:s indicate time instances for read-out into an outgoing frame relative to the time axis $t_{int}$.

A processor in the control system 2 executes the algorithm according to the invention starting from the values of the input parameters given above.

1. The incoming time slot numbers are normalized against internal frames in accordance with the flow diagram of FIG. 5. The help vector of normalized incoming time slot numbers $t_{in0}$ then becomes {128, 256, 385}.

2. A value of the offset-variable δ is determined in accordance with the flow diagram of FIG. 6. The offset-value then becomes δ=1.

3. Distribution information in form of storage positions 45.n and 46.n in the control memories 21 and 23, respectively, is determined in accordance with the flow diagram of FIG. 7a. The result is that the control information {372, 15, 243} is put in control memory 21 in the positions 45.{183, 327, 378}, and the control information {221, 36, 167} is put in control memory 23 in the positions 46.{183, 327, 378} . Since δ=1, the incoming time slot numbers and the outgoing time slot numbers are displaced one position in the respective control memories. As an example, the incoming time slot number 15 will end up in position 45.327 instead of in 45.183, the incoming time slot number 243 in position 45.378 instead of in 45.327 and the incoming time slot number 372 in position 45.183(+512) instead of in 45.378.

4. The internal time slot numbers are normalized against outgoing frames with consideration to the offset-variable in accordance with the flow diagram of FIG. 8. The help vector of normalized internal time slot numbers $t_{int1}$, then becomes {151, 102, 419}.

5. The base value variable first_frame_start is determined in accordance with the flow diagram of FIG. 9. The value of this base value variable represents the outgoing frame to which the fastest incoming time slot could be switched to without consideration to frame integrity correcting mechanisms. According to the distribution information determined in step 3 with consideration to the offset value 1, data in incoming time slot 15 can be switched to internal time slot 327 and then at the earliest switched for read-out to time slot 36 in the outgoing frame B. With regard to time, it is not possible to switch this data for read-out to time slot 36 in the outgoing frame A. However, it is possible to switch user data from incoming time slot 243 to internal time slot 378 and on to outgoing time slot 167 in the outgoing frame A. In this way, first_frame_start gets the value zero, which represents the outgoing frame A.

6. In accordance with the flow diagram of FIG. 10, it is determined whether any time slot is associated with a subsequently following frame relative to the frame represented by the base value zero. In other words, whether there is any incoming time slot, the data of which is switched to the outgoing frame B. From FIG. 12 it can be seen that data in the incoming time slots 15 and 372, with regard to time, have to be switched to the outgoing frame B. Consequently, the variable B_none_in_second_frame gets the value FALSE.

7. Control information in form of delay values is determined and stored in the positions 47.n in the control memory 23 in accordance with the flow diagram of FIG. 11. NO_DELAY is stored in the storage positions 47.183 and 47.327, and DELAY is stored in the storage position 47.378. In practice, this means that user data from the incoming time slot 243 that is switched to the internal time slot 378 is delayed one frame such that this data is not read out in time slot 167 in outgoing frame A, but instead is read out in time slot 167 in outgoing frame B.

In this way, the switch is set up such that such that both sequence and frame integrity are preserved through the switch for the desired wideband connection. Data in the incoming time slots 15, 243, 372 in incoming frame B are read out in the same reciprocal order in time slots 36, 167, 221 in outgoing frame B.

The control information in the positions 45.n and 46.n makes sure that user data is switched such that sequence integrity is preserved. The control information in the positions 46.n and 47.n are read out to the delay control unit 26 which generates delay information. This delay information controls, for each internal time slot, to which one of the first 48 and the second part 49 of the speech memory 17 in the outgoing time switch stage 6.n that user data in the internal time slot is to be switched. In this way, the delay information controls whether user data is to appear in a first possible frame of outgoing time slots or be delayed an extra frame.

The above embodiments of the invention are merely examples of how the inventive concept can be realized and the invention is not limited thereto. It is possible to embody the invention in specific forms other than those described without departing from the spirit and the basic principles of the invention.

As an example, the time slot counter circuit 28 may be realized by three separate counters that more or less directly generates the counter values and phase values, respectively, that are outputted at the outputs 29, 30 and 31 in FIG. 3.

The given algorithm can be modified such that it may be used with a hardware configuration different from that which is shown.

The scope of the present invention is defined by the appended patent claims, and further modifications and improvements which retain the basic principles described and claimed herein are within the scope of the invention.

What is claimed is:

1. A time switch stage for switching user data, belonging to a connection, between first time slots and second time slots, comprising:

a speech memory for storing said user data, said first and second time slots being arranged in respective frames, wherein said speech memory includes a first part and a second part, each of which has storage positions that in number correspond to the number of time slots in a frame such that said first part and said second part of said speech memory correspond to respective frames of second time slots; a control memory for storing control information controlling the switching; and a delay control unit for generating delay information based on at least said control information in said control memory, said delay information controlling, for each first time slot, to which one of said first part and said second part of said speech memory that user data in the first time slot is to be switched.

2. The time switch stage according to claim 1, wherein said first time slots correspond to time slots arriving at said switch stage, and said second time slots correspond to time slots going out from said switch stage.

3. The time switch stage according to claim 1, further comprising a time slot counter circuit for generating counter information, wherein said delay information is generated from said control information in said control memory and a determined part of said counter information from said time slot counter circuit.

4. The time switch stage according to claim 1, wherein one part of said speech memory corresponds to a first frame of second time slots, and the other part of said speech memory corresponds to a following second frame of second time slots.

5. The time switch stage according to claim 4, wherein said control information in said control memory includes, for each first time slot, first control data indicating to which second time slot in one of said first and said second frame that user data in the first time slot is to be switched, and second control data representative of whether user data in the first time slot is to be switched to said first frame of second time slots or delayed a frame.

6. The time switch stage according to claim 3, wherein said time slot counter circuit includes:

a counter which in a counter sequence generates first counter values that in number correspond to the number of time slots in two frames; and first phase shifting means for generating second counter values that are phase shifted in relation to said first counter values by a distance representing a difference in phase between frames for said second time slots and frames for said first time slots, said determined part of said counter information from said time slot counter circuit including at least one of said second counter values.

7. The time switch stage according to claim 5, further comprising first addressing means responsive to said first control data and said delay information for addressing a storage position in said speech memory in which user data from the first time slot is stored.

8. The time switch stage according to claim 5, wherein each second control data includes a bit representing delay.

9. The time switch stage according to claim 5, wherein said time slot counter circuit includes:

a counter which in a counter sequence generates first counter values that in number correspond to the number of time slots in two frames; and first phase shifting means for generating second counter values that are phase shifted in relation to said first counter values by a distance representing a difference in phase between frames for said second time slots and frames for said first time slots, said determined part of said counter information from said time slot counter circuit including at least one of said second counter values; and wherein said delay control unit is responsive to control information, first control data and second control data, from said control memory and said second counter values, and includes:

a first comparator for comparing a first control data and a representation of a second counter value for generating a first comparison result;

a second comparator for comparing a second counter value and the number of time slots in a frame for generating a second comparison result;

a primary XOR-gate for-performing a first XOR-operation between said first comparison result and said second comparison result; and a secondary XOR-gate for performing an XOR-operation between the result of said first XOR-operation and a second control data to generate said delay information.

10. The time switch stage according to claim 9, wherein said representation of said second counter value corresponds to a second time slot.

11. The time switch stage according to claim 6, wherein said time slot counter circuit further comprises means responsive to said first counter values for cyclically generating a sequence of read-out counter values, in number equal to the number of time slots in a frame, said read-out counter values from said means controlling a second addressing means for reading said control information from said control memory.

12. The time switch stage according to claim 6, wherein read-out of user data in said speech memory is performed cyclically according to a fixed sequence in dependence on said second counter values, one storage position each second time slot such that each storage position represents a given second time slot in every second frame.

13. A switch structure comprising:
an incoming time switch stage responsive to user data belonging to a connection and appearing in a number of incoming time slots in a frame, for placing these user data in internal time slots;
an intermediate space switch stage for handling said internal time slots; and
an outgoing time switch stage for placing the user data of said internal time slots in outgoing time slots; each one of said incoming time switch stage and said outgoing time switch stage including a speech memory for storing user data and a control memory for storing control information controlling the switching of said user data between said time slots, wherein said speech memory in said outgoing time switch stage includes a first part and a second part, each of which has storage positions that, in number, correspond to the number of time slots in a frame such that said first part and said second part of said speech memory correspond to respective frames of outgoing time slots; and
a delay control unit for generating delay information based on at least the control information in the control memory of said outgoing time switch stage, said delay information controlling, for each internal time slot, to which one of said first part and said second part of said speech memory in said outgoing time switch stage that user data in the internal time slot is to be switched.

14. The switch structure according to claim 13, further comprising:
a control system for providing said control information; and
a time slot counter circuit for generating counter information, said delay information being generated from said control information in said control memory of said outgoing time switch stage and a first determined part of said counter information from said time slot counter circuit.

15. The switch structure according to claim 13, wherein said control information in said control memory of said outgoing time switch stage includes, for each internal time slot, first control data indicating to which outgoing time slot in a frame that user data in the internal time slot is to be switched, and second control data representative of whether user data in the internal time slot is to be switched to a first frame or delayed to a second frame of outgoing time slots.

16. The switch structure according to claim 14, wherein said time slot counter circuit includes:
a counter which in a counter sequence generates first counter values in number corresponding to the number of time slots in two frames; and
first phase shifting means for generating second counter values that are phase shifted in relation to said first counter values by a distance representing a difference in phase between frames for said outgoing time slots and frames for said internal time slots, said first determined part of said counter information from said time slot counter circuit including said second counter values.

17. The switch structure according to claim 15, further comprising first addressing means responsive to said first control data and said delay information for addressing a storage position in said speech memory in which user data from the internal time slot is stored.

18. The switch structure according to claim 15, wherein each second control data includes a bit representing delay.

19. The switch structure according to claim 15, wherein, said time slot counter circuit further includes:
a counter which in a counter sequence generates first counter values in number corresponding to the number of time slots in two frames; and
first phase shifting means for generating second counter values that are phase shifted in relation to said first counter values by a distance representing a difference in phase between frames for said outgoing time slots and frames for said internal time slots, said first determined part of said counter information from said time slot counter circuit including said second counter values; and wherein
said delay control unit is responsive to control information, in the form of said first control data and second control data, from said control memory of said outgoing time switch stage and said second counter values, and includes:
a first comparator for comparing a first control data and a representation of a second counter value for generating a first comparison result;
a second comparator for comparing a second counter value and the number of time slots in a frame for generating a second comparison result;
a primary XOR-gate for performing a first XOR-operation between said first comparison result and said second comparison result; and
a secondary XOR-gate for performing an XOR-operation between the result of said first XOR-operation and a second control data for generating said delay information.

20. The switch structure according to claim 19, wherein said representation of said second counter value corresponds to a second time slot.

21. The switch structure according to claim 16, wherein said time slot counter circuit further includes means responsive to said first counter values for cyclically generating a sequence of read-out counter values, in number equal to the number of time slots in a frame, said read-out counter values from said means controlling a second addressing means for reading control information from said control memory of said outgoing time switch stage.

22. The switch structure according to claim 16, wherein read-out of user data in said speech memory of said outgoing time switch stage is performed cyclically according to a fixed sequence in dependence on said second counter values, one storage position every second time slot, such that each storage position represents a given outgoing time slot in every second frame.

23. A time switch stage for switching user data, belonging to a connection, between first time slots and second time slots, comprising a speech memory for storing said user data, said first and second time slots being arranged in respective frames, wherein said speech memory includes a first part and a second part, each of which has storage positions that, in number, correspond to the number of time slots in a frame such that said first part and said second part correspond to respective frames of second time slots; a control memory for storing control information controlling the switching; and
a delay control unit for generating delay information based on at least said control information in said control memory, said delay information controlling, for each second time slot, from which one of said first part and said second part of said speech memory that user data is to be switched to the second time slot.

24. The time switch stage according to claim 23, further comprising a time slot counter circuit for generating counter information, wherein said delay information is generated from said control information in said control memory and a determined part of said counter information from said time slot counter circuit.

25. The time switch stage according to claim 23, wherein said first time slots correspond to time slots arriving at said switch stage, and said second time slots correspond to time slots going out from said switch stage.

26. The time switch stage according to claim 23, wherein one part of said speech memory corresponds to a first frame of second time slots, and the other part of said speech memory corresponds to a following second frame of second time slots.

27. The time switch stage according to claim 23, wherein said control information in said control memory includes, for each second time slot, first control data indicating from which storage position in one of said first part and said second part of said speech memory that user data is to be switched to the second time slot, and second control data representative of whether this user data is to be switched from said first part or said second part of said speech memory.

28. The time switch stage according to claim 24, wherein said time slot counter circuit includes:
   a counter which in a counter sequence generates first counter values that in number correspond to the number of time slots in two frames; and
   first phase shifting means for generating second counter values that are phase shifted in relation to said first counter values by a distance representing a difference in phase between frames for said second time slots and frames for said first time slots, said determined part of said counter information from said time slot counter circuit including said second counter values.

29. The time switch stage according to claim 28, wherein said time slot counter circuit includes:
   a counter which in a counter sequence generates first counter values that in number correspond to the number of time slots in two frames; and
   first phase shifting means for generating second counter values that are phase shifted in relation to said first counter values by a distance representing a difference in phase between frames for said second time slots and frames for said first time slots, said determined part of said counter information from said time slot counter circuit including said second counter values; and wherein
   said delay control unit is responsive to control information, first control data and second control data, from said control memory and said second counter values, and includes:
      a first comparator for comparing a first control data and a representation of a second counter value for generating a first comparison result;
      a second comparator for comparing a second counter value and the number of time slots in a frame for generating a second comparison result;
      a primary XOR-gate for performing a first XOR-operation between said first comparison result and said second comparison result; and
      a secondary XOR-gate for performing an XOR-operation between the result of said first XOR-operation and a second control data for generating said delay information.

30. A switch structure comprising:
   an incoming time switch stage responsive to user data belonging to a connection and appearing in a number of incoming time slots in a frame, for placing these user data in internal time slots;
   an intermediate space switch stage for handling said internal time slots; and
   an outgoing time switch stage for placing the user data of said internal time slots in outgoing time slots each one of said incoming time switch stage and said outgoing time switch stage including a speech memory for storing user data and a control memory for storing control information, wherein said speech memory in said incoming time switch stage includes a first part and a second part, each of which has storage positions that, in number, correspond to the number of time slots in a frame such that said first part and said second part correspond to respective frames of internal time slots; and
   a delay control unit for generating delay information based on at least the control information in said control memory in said incoming time switch stage, said delay information controlling, for each internal time slot, from which one of said first part and said second part of said speech memory in said incoming time switch stage that user data is to be switched to the internal time slot.

31. The switch structure according to claim 30, further comprising:
   a control system for providing said control information; and
   a time slot counter circuit for generating counter information, said delay information being generated based on said control information in said control memory of said incoming time switch stage and a first determined part of said counter information from said time slot counter circuit.

32. The switch structure according to claim 30, wherein said control information in said control memory of said incoming time switch stage includes, for each internal time slot, first control data indicating from which storage position in one of said first part and said second part of said speech memory that user data is to be switched to the internal time slot, and second control data representative of whether this user data is to be switched from said first part or said second part of said speech memory.

33. The switch structure according to claim 31, wherein said time slot counter circuit includes:
   a counter which in a counter sequence generates first counter values in number corresponding to the number of time slots in two frames; and
   first phase shifting means for generating second counter values that are phase shifted in relation to said first counter values by a distance representing a difference in phase between frames for said internal time slots and frames for said incoming time slots, said first determined part of said counter information from said time slot counter circuit including said second counter values.

34. The switch structure according to claim 32, wherein said time slot counter circuit includes:

- a counter which in a counter sequence generates first counter values in number corresponding to the number of time slots in two frames; and
- first phase shifting means for generating second counter values that are phase shifted in relation to said first counter values by a distance representing a difference in phase between frames for said internal time slots and frames for said incoming time slots, said first determined part of said counter information from said time slot counter circuit including said second counter values; and wherein
- said delay control unit is responsive to control information, in form of said first control data and second control data, from said control memory of said incoming time switch stage and said second counter values, and includes:
  - a first comparator for comparing a first control data and a representation of a second counter value for generating a first comparison result;
  - a second comparator for comparing a second counter value and the number of time slots in a frame for generating a second comparison result;
  - a primary XOR-gate for performing a first XOR-operation between said first comparison result and said second comparison result; and
  - a secondary XOR-gate for performing an XOR-operation between the result of said first XOR-operation and a second control data for generating said delay information.

35. The switch structure according to claim 33, wherein writing of user data into said speech memory of said incoming switch stage is performed cyclically according to a fixed sequence in dependence on said second counter values, one storage position every second time slot such that each storage position represents a given incoming time slot in every second frame.

* * * * *

UNITED STATES PATENT AND TRADEMARK OFFICE
CERTIFICATE OF CORRECTION

PATENT NO. : 6,157,639
DATED : December 5, 2000
INVENTOR(S) : Lindberg et al.

It is certified that error appears in the above-identified patent and that said Letters Patent is hereby corrected as shown below:

Claim 1, column 19,
Line 42, before "second" insert -- the --;
Lines 46-47, delete ", for each first time slot,";
Line 49, after "in" insert -- each of -- and delete "slot" and insert therefor -- slots --.

Claim 4, column 19,
Line 62, before "second" insert -- the --.
Line 63, before "second" insert -- the --.

Claim 5, column 20,
Line 1, after "first" insert -- frame --.

Signed and Sealed this

Twenty-third Day of October, 2001

Attest:

*Nicholas P. Godici*

NICHOLAS P. GODICI
Attesting Officer    Acting Director of the United States Patent and Trademark Office